US00H002208H

(19) United States
(12) Statutory Invention Registration
Stytz et al.
(10) Reg. No.: US H2208 H
(43) Published: Jan. 1, 2008

(54) INTELLIGENT AGENT REMOTE TRACKING OF CHEMICAL AND BIOLOGICAL CLOUDS

(75) Inventors: Martin R. Stytz, Beavercreek, OH (US); Sheila B. Banks, Orlando, FL (US)

(73) Assignee: United States of America as represented by the Secretary of the Air Force, Washington, DC (US)

(21) Appl. No.: 10/336,301

(22) Filed: Jan. 6, 2003

(51) Int. Cl.
*G06G 7/48* (2006.01)

(52) U.S. Cl. ..... 703/12

(58) Field of Classification Search ..... 702/19, 702/22; 703/12
See application file for complete search history.

(56) References Cited

U.S. PATENT DOCUMENTS

| | | | | |
|---|---|---|---|---|
| 4,737,847 A | | 4/1988 | Araki et al. | |
| 5,091,780 A | | 2/1992 | Pomerleau | |
| 5,109,380 A | | 4/1992 | Ogino | |
| 5,140,523 A | | 8/1992 | Frankel et al. | |
| 5,265,031 A | | 11/1993 | Malczewski | |
| 5,648,914 A | * | 7/1997 | Bauer et al. | 702/19 |
| 5,724,255 A | | 3/1998 | Smith et al. | |
| 5,796,611 A | | 8/1998 | Ochiai et al. | |
| 5,808,916 A | | 9/1998 | Orr et al. | |
| 6,081,750 A | | 6/2000 | Hoffberg et al. | |
| 6,192,364 B1 | | 2/2001 | Baclawski | |
| 6,212,649 B1 | | 4/2001 | Yalowitz et al. | |
| 6,360,193 B1 | | 3/2002 | Stoyen | |
| 2002/0041328 A1 | * | 4/2002 | LeCompte et al. | 348/144 |
| 2004/0064260 A1 | * | 4/2004 | Padmanabhan et al. | 702/19 |
| 2004/0257227 A1 | * | 12/2004 | Berry | 340/540 |

* cited by examiner

*Primary Examiner*—M. Clement
(74) *Attorney, Agent, or Firm*—Gerald B. Hollins; AFMCLO/JAZ

(57) ABSTRACT

An intelligent agent-accomplished detection and tracking system responsive to sensed characteristics in a cloud of chemical or biological warfare agent(s) dispersed over a geographic area of the earth. The intelligent agent elements of the invention provide an organized and repeated comparison of signal data extracted from overhead dispersed conventional sensors of the chemical or biological agent material and accomplish communication with other agents and the outside world using a common flexible communication language. The intelligent agent elements are disposed in hierarchical arrays having at least lower level, mid level and upper level locations and are inclusive of multiple path forward and feedback agent communications.

22 Claims, 12 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

INTELLIGENT AGENT REMOTE TRACKING OF CHEMICAL AND BIOLOGICAL CLOUDS

RIGHTS OF THE GOVERNMENT

The invention described herein may be manufactured and used by or for the Government of the United States for all governmental purposes without the payment of any royalty.

BACKGROUND OF THE INVENTION

Currently, there is no known wide-area, permanently deployed capability for detecting or tracking chemical attacks on the United States or other nations. Under these conditions, there can be little notice or warning of such an attack nor ability to track the spread of a cloud of the attack agent(s). A system capable of providing warning and tracking for mass attacks by detecting the release, dispersion, and drift of a chemical cloud is however believed technically feasible. Such a system can provide warning from the time of release until an attack agent cloud disperses to the point of no longer posing a threat. Current events demonstrate the need for a capability for detecting such an attack and tracking it, at a level of capability above merely following the progress of the attack by monitoring those who have been affected. While no one presently available technology can provide the capability for such warning and tracking, a combination of remote sensors, some of which can provide response to both chemical and biological agents, can provide a high degree of confidence, specificity, and sensitivity so that a space-based system can effectively function as an attack early-warning system. The present invention is believed to provide a significant part of such a system.

As may now be or subsequently become apparent herein the word "agent" may appear in two differing contexts with respect to the present invention; the first of these contexts, as may be appreciated from the above recited invention title for example, relates to the building blocks appearing in portions of the disclosed chemical detection system architecture. The second context for this word "agent" of course relates to the chemically reactive material used by an enemy to inflict harm. Since the word "agent" appears to be proper and of current usage in each of these contexts and appears unlikely to cause reading or interpretation confusion no effort to substitute a less desirable synonym is made in this description.

SUMMARY OF THE INVENTION

The present invention provides an aircraft, spacecraft or elevated location-based system for detecting and tracking large scale chemical and biological warfare attack agent dispersals.

It is therefore an object of the present invention to provide an elevation-based system to detect and track chemical and biological warfare agent attacks.

It is another object of the invention to provide the algorithms and processing concepts needed by an overviewing system to detect and track chemical and biological warfare agent attacks.

It is another object of the invention to provide a communication system usable between signal processing intelligent agents organized in a hierarchy.

It is another object of the invention to provide for the processing of data generated by a plurality of sensors in response to a large-scale release of chemical and/or biological warfare agents.

It is another object of the invention to provide a hierarchical organized array of intelligent agent decision elements suitable for use in large mapping projects.

These and other objects of the invention will become apparent as the description of the representative embodiments proceeds.

These and other objects of the invention are achieved by the method of detecting and tracking chemical and biological warfare agent plumes over a geographic area, said method comprising the steps of:

disposing a plurality of diverse input condition responsive warfare agent sensor elements above said geographic area of detecting and tracking;

coupling an output from each of said diverse input condition responsive warfare agent sensor elements to a sensor-specific first level intelligent agent decision element in a hierarchical array of intelligent agent decision elements;

extracting, in said sensor specific first level intelligent agent decision element, cloud-related signal indicia from said output, said extracting including applying segmented output data and first level intelligent agent knowledge base data to a decision engine algorithm portion of said sensor-specific first level intelligent agent decision element to generate a sensor-specific first level intelligent agent decision element eXtensible markup language document type definition output;

said sensor-specific first level intelligent agent decision element eXtensible markup language document type definition output also including a cloud identification output and a warfare agent sensor element output quality-determined first confidence signal;

applying said eXtensible markup language document type definition output of said sensor-specific first level intelligent agent decision element to a plurality of second and successive other mid level intelligent agent decision elements in said hierarchical array of intelligent agent decision elements;

evaluating in said mid level intelligent agent elements cloud, weather condition, ground condition and cloud duplicate related outputs received via said mid level eXtensible markup language document type definition outputs of said first level intelligent agent elements;

said evaluating step including a determination of possible natural cause for said cloud-related outputs, a determination of said cloud-related outputs being a warfare agent plume and a determination of a second confidence signal, said determinations being encoded into an intelligent agent decision element eXtensible markup language document type definition output;

connecting said second intelligent agent decision element eXtensible markup language document type definition output to a plurality of upper level intelligent agent decision elements in said hierarchical array of intelligent agent decision elements;

determining in said plurality of upper level intelligent agent decision elements in said hierarchical array of intelligent agent decision elements an occurrence of a warfare substance attack event and a course of travel for said warfare agent plume in said geographic area, said determining including determining a third confidence signal level and encoding of said determining step signals into an intelligent agent decision element eXtensible markup language document type definition output.

BRIEF DESCRIPTION OF THE DRAWINGS

The accompanying drawings incorporated in and forming a part of the specification, illustrate several aspects of the present invention and together with the description serve to explain the principles of the invention. In the drawings.

DETAILED DESCRIPTION OF THE INVENTION

Figure 1:
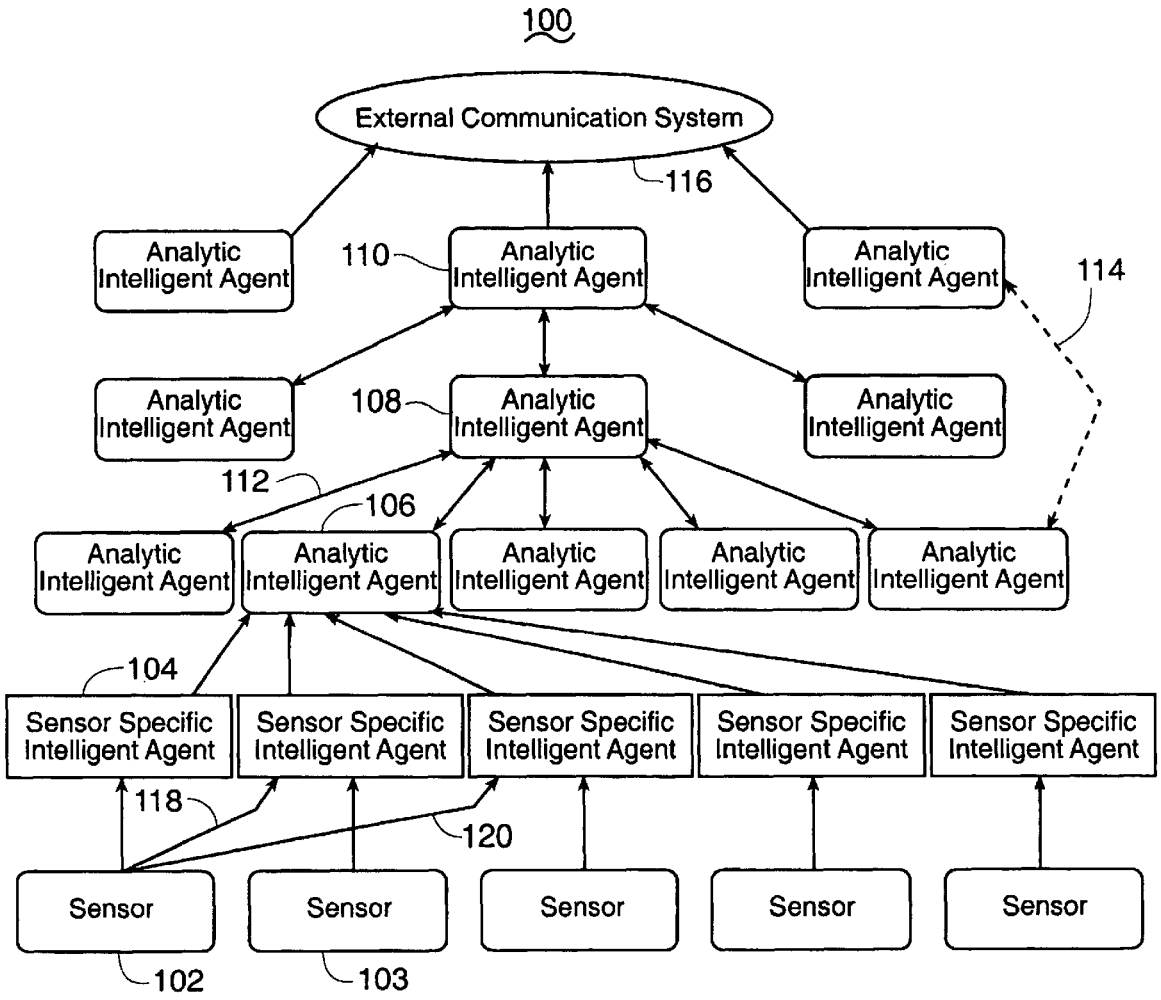
FIG. 1 shows a hierarchical agent configuration usable in embodiments of the invention.

The following description involves discussions of combination of a chemical warfare agent, a biological warfare agent and a plurality of intelligent agent algorithm architectures. In order to avoid confusion among these three differing "agents", especially between either of the first two of these agents and the latter agent, the word "substance" is used to the best degree reasonably possible in referring to the first two of these agents, i.e., to agents described as a chemical warfare substance or a biological warfare substance or generically as a "substance". No change in meaning is intended by this semantic clarification however.

The present invention therefore concerns an intelligent agent architecture and processes usable for the detection and tracking of a large-scale chemical substance release by way of sensors placed at high altitude or in space. The invention includes a description of the sensor signal processing architecture and its operation and the overall processes used to allow a combined sensor suite to detect, warn-of, and track a chemical or biological agent cloud. In the invention, chemical or biological agent attack detection and warning is based upon unique physical properties that can be identified remotely and then correlated to provide a high probability of accurate identification. Known technologies can be used as sensors and can consist of, for example, conventional infrared sensors, radar, synthetic aperture radar, and ultraviolet sensors that detect properties of a cloud (both reflective and transmissive properties) as well as the temperature, moisture, and visual characteristics of any cloud. The sensors can be disposed above a geographic area of interest by way of terrain features, aircraft or satellites or other means as known in the art. The detected properties enable early and rapid detection of a cloud. Weather information can be included in the analysis of sensor data. Taken together, these same properties also allow a cloud to be tracked until it has dissipated.

An intelligent agent is a software system that contains knowledge about a problem domain, is capable of making decisions relative to that domain, possesses artificial intelligence, and knows something about the context of any request made of it. An intelligent agent also has the knowledge needed to process the information given to it. Finally, such agents can operate as a society to enable rapid data interchange and correlation of analysis results and have the ability to exchange information within the context of a "contract" that specifies the form, content, and conditions under which information is exchanged. An intelligent agent functions continuously and autonomously within an environment that may be inhabited by other agents. Generally, intelligent agents can learn from experience, and by virtue of their ability to communicate they can cooperate to perform tasks.

Intelligent agents have three defining characteristics, agency, intelligence, and communication. Agency is the capability of an agent to act independently in the pursuit of the accomplishment of a task. Intelligence encompasses the degree of reasoning in the intelligent agent's objectives. Communication allows intelligent agents to share information and analyses, enables a problem to be partitioned between agents, and allows an intelligent agent system to scale its performance with an increase in computational power availability and with increased network bandwidth.

The architectural outline of the invention discloses a set of intelligent agents that communicate using either a hierarchical paradigm arrangement or combined blackboard and hierarchical paradigm arrangement. Each intelligent agent produces as assessment of some aspect of the environment based upon its inputs. The assessment consists of, at a minimum, a rating and an XML-based description of the inputs and a textual description of the outputs. In the invention, the concept is to attach a rich but constrained semantics to the analytical outputs from the agent so that other intelligent agents can use the textual description and numerical rating to further develop their assessments. The letters XML used herein are an abbreviated reference to the eXtensible Markup Language, a descriptive media found helpful in describing the invention. Additional information regarding the eXtensible Markup Language is included in the discussion and listing of references appearing in Appendix 1 immediately preceding the claims of the present document.

Two types of intelligent agents appear in the present invention. The first type comprises agents that are responsible for directly analyzing sensor outputs. The second type comprises agents that primarily analyze the outputs from other intelligent agents. Decision-making within an agent is performed by one or more decision engines, as discussed below. Intelligent agents that directly process sensor outputs have as their primary tasks segmenting the data in order to extract features, determining the location of each segment, and assigning property values to each segment. These agents are found at the bottom of the hierarchy and are used to locate features in the environment that may be of chemical or biological plumes nature. These features are called segments because they are identified using a segmentation process. The intelligent agents located higher in the hierarchy are used to analyze the outputs from other intelligent agents and have as their task the detection of patterns within the data, determining correlations between patterns, detecting correlations between segments and properties between different sensors, and determining if a previously detected correlation between segments or properties has changed location. Once a segment has been identified as a chemical or biological cloud, it is called a plume. The intelligent agents highest in the hierarchy have as their tasks the determination of whether or not one or more chemical or biological clouds have appeared in the environment and its/their motion.

To enable rapid analysis and correlation of sensor signals, either a hierarchical or hybrid hierarchy-blackboard intelligent agent system can be used as the overall architecture for the invention. When a hierarchy of agents is used, as shown in the system 100 of FIG. 1, the intelligent agents lowest in the hierarchy interface directly with a sensor and are used to analyze a single property as reported by a sensor signal. The intelligent agent 104 in FIG. 1 is used to analyze the data from the infrared sensor 102 for example. The results of the analysis by the intelligent agents lowest in the hierarchy are transmitted to other intelligent agents higher in the hierarchy, as at 106 in FIG. 1. These agents correlate the analyses from a number of lower-level agents to determine if an attack has occurred. The agents in the higher parts of the hierarchy, the agents at 108 and 110 for example, can also use the correlated results to track a chemical or biological agent cloud once it is detected. The agents in the higher parts of the hierarchy also feed back analytical results from higher levels of the hierarchy to the lower levels of the hierarchy. Feedback consists of control inputs for the lower level agents and of analytical results in order to aid the low level agents in their task of locating and tracking a cloud. Feedback is also used to vary the segmentation settings, threshold settings and decision criteria used by an agent to determine if a biological or chemical cloud is present. Feedback can go from any intelligent agent at a higher level of the hierarchy to any intelligent agent at a lower level of the hierarchy as is represented at 112 and 114 in FIG. 1, but in practice feedback is primarily routed to intelligent agents at the level of the hierarchy that is one level below as at 112 in the FIG. 1 system.

The size of a cloud that can be detected and tracked by a system of the FIG. 1 type is constrained only by the sensitivity of the sensors used at 102 and 103 for example. For the sake of clarity, the FIG. 1 drawing shows only the outputs from one level of the hierarchy being sent to a single agent at the next level, but in practice each agent at a given level communicates with every agent at the next level of the hierarchy as is represented at 118 and 120 in FIG. 1 for example. The intelligent agents at all but the lowest level of the hierarchy are used to correlate, analyze, and consolidate outputs from lower levels in order to determine if a chemical or biological cloud is present and if so its size and direction of motion. Within the invention, each intelligent agent can use any decision-making system to analyze inputs provided by a sensor or other intelligent agents, or both. Therefore, Bayesian networks, fuzzy logic, rules, case based reasoning, probabilistic reasoning, genetic algorithms, or other reasoning techniques may be used by any intelligent agent in the invention.

Correlation can be performed using a statistical technique, such as a weighted sum or a linear correlation. The intelligent agents in the highest level of the hierarchy interface to an external communication system as indicated at 116 in FIG. 1 to handle aspects of communicating the outputs from the hierarchy.

Blackboard System

Figure 2:
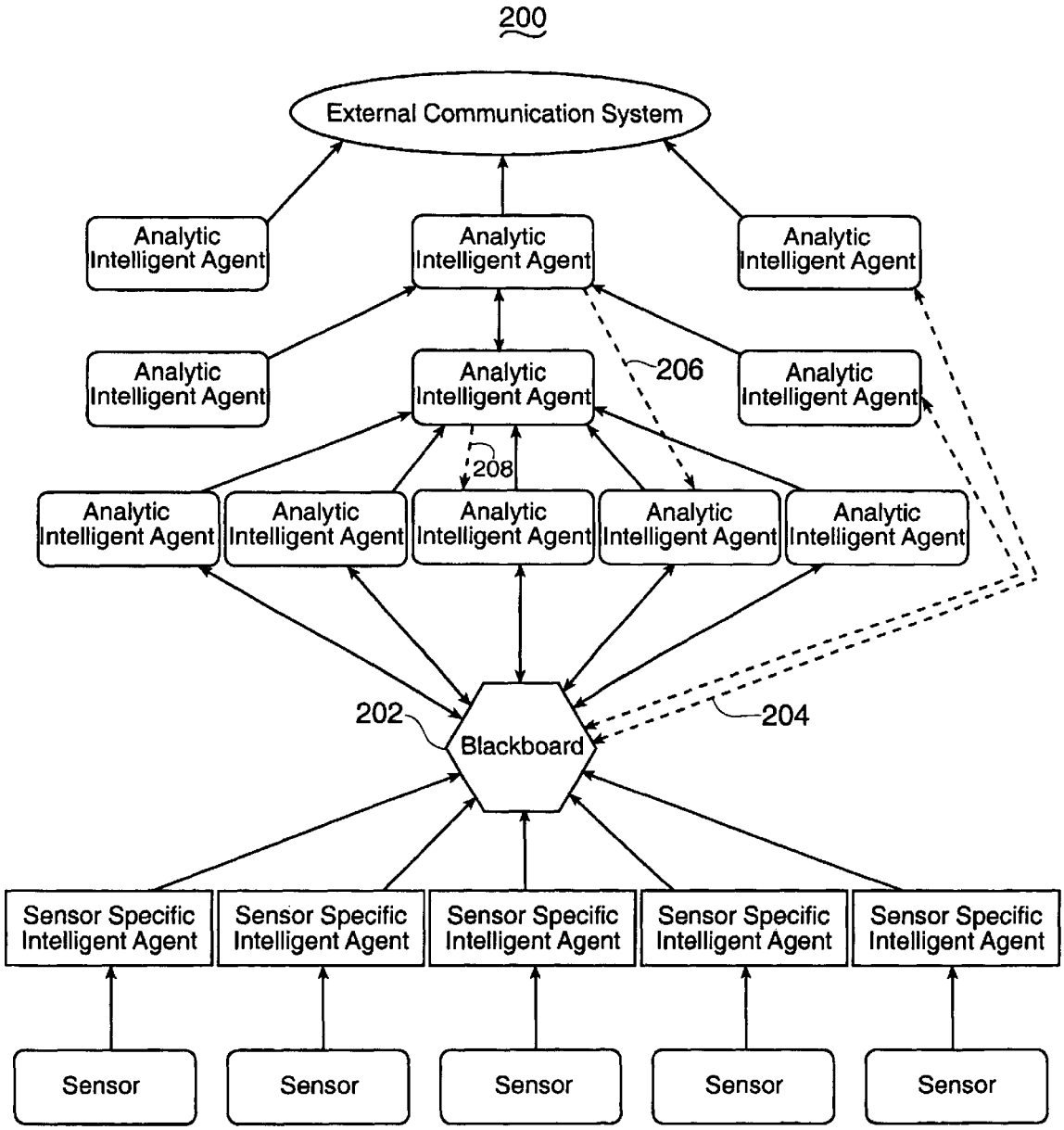
FIG. 2 shows a hierarchical agent configuration inclusive of blackboard communication usable in embodiments of the invention.

In the arrangement of the invention wherein where a blackboard system is used, as shown at 200 in FIG. 2, an intelligent agent is again dedicated to each sensor and is used to analyze a singlec property in a sensor signal. The intelligent agent architecture is again overall a hierarchy. However, the first two levels of the hierarchy communicate by posting their outputs to a common blackboard 202. The results of this analysis are posted to blackboard 202 for other intelligent agents to use as part of their analysis to determine if a chemical or biological cloud is present and to track the cloud. The higher levels of the hierarchy have the same operational responsibilities as the intelligent agents in the FIG. 1 first configuration of the invention.

FIG. 2 thus shows the invention configured to use a common blackboard for communication between intelligent agents in the first two levels of the hierarchy of intelligent agents. In this configuration of the invention feedback between intelligent agents at the two lowest levels of the hierarchy is accomplished using the blackboard, any information to be passed from one intelligent agent to another is placed on the blackboard where any other agent may note its presence and act upon the information. Feed back from higher levels of processing to the two first levels of processing is also accomplished by the higher level agents posting their feed back results on the blackboard as is shown at 204 for example. Feed back between intelligent agents from the highest levels of the hierarchy is accomplished in the same manner as in the first configuration for the invention. That is, feed back at the upper levels of the hierarchy can go from any intelligent agent at a higher level of the hierarchy to any intelligent agent at a lower level of the hierarchy as is represented at 206 for example, but in practice feedback is primarily routed to intelligent agents at the level of the hierarchy that is one level below as is represented at 208 for example.

For the sake of clarity, FIG. 2 shows only the outputs from one level of the hierarchy being sent to a single agent at the next level, but in practice each agent at a given level communicates with every agent at the next level of the hierarchy above the level in the hierarchy where the blackboard is placed. As in the case of the FIG. 1 hierarchy, the size of the chemical or biological cloud that can be detected and tracked is constrained only by the sensitivity of the sensors. As in the FIG. 1 configuration of the invention, within this configuration of the invention, each intelligent agent is free to use any decision-making system to analyze its inputs from either a sensor or from other intelligent agents, or both. Therefore, Bayesian networks, fuzzy logic, rules, case based reasoning, probabilistic reasoning, genetic algorithms, or other reasoning techniques may be used by any intelligent agent in the system. Correlation can be performed using a statistical technique, such as a weighted sum or a linear correlation. The intelligent agents in the highest level of the hierarchy interface to an external communication system that handles all aspects of communication of the outputs from the hierarchy.

Within the invention, each agent outputs an assessment based upon sensors'outputs or on the outputs from other intelligent agents. The assessment from an intelligent agent contains a rating, an assessment (in text), a confidence level for the assessment, and other information as described below. The output from an intelligent agent in the invention is constrained to what is permitted in the eXtensible Markup Language (XML) Document Type Definition (DTD) defined for the invention and contains a description of the intelligent agent's analysis and assessment so other agents can use both the analysis and assessment as inputs for their own reasoning and assessments. The output from each intelligent agent in the invention is expressed using the eXtensible Markup Language. Intelligent agents can output their assessment, a confidence in the assessment, and the raw values for any or all of the sensors that it used to make the assessment along with other information.

At the lowest level of the hierarchy are the sensor specific intelligent agents. These agents have as their primary responsibility the task of extracting information that can be indicative of a chemical or biological agent attack from the data provided by its sensor. As each sensor or data source generates data it passes the data to its dedicated intelligent agent. Once the data arrives at the agent, the agent performs segmentation on the data to look for signs of a chemical or biological cloud and attempts to isolate any signs of a cloud based upon the agent's mission tasking by using the information in its knowledge base. Each low level agent is tasked with making a determination about the characteristics of the observed world based upon the output of one sensor, with the option of using decision engines to do so.

The output from an intelligent agent can consist of a composite of the analyses of all of the decision engines and can also include the analysis and confidence level for each decision engine in the intelligent agent. If a decision is allowed to make an output to the hierarchy, it must also include a confidence value with its assessment. Each intelligent agent or agent society continues its analysis on the data until it either can make a conclusive determination concerning the presence of a cloud or new data arrives from the sensor. The low-level intelligent agents are tasked with identifying clouds and are responsible for attaching cloud identifiers to clouds. If an assessment is made, then the intelligent agent makes a determination of the confidence value for the assessment. The confidence value can be determined using a look up table, a formula, or other means that takes into account the quality of the data. Then, the agent completes the DTD by filling in those portions for which it has data and then sends the DTD to all of the agents in the next level of the hierarchy.

The mid-level agents in the hierarchy have as their inputs data provided by intelligent agents at lower levels in the hierarchy. These inputs from the lower levels can be optionally consolidated using different weighting factors and the raw sensor data as provided by their intelligent agents. The output from a mid-level intelligent agent can consist of a composite of the analyses of all of its decision engines and can also include the analysis and confidence level for each decision engine in the intelligent agent. If a mid-level agent makes an output to the hierarchy, it must also include a confidence value with its assessment. Because the mid-level intelligent agents have a multitude of inputs from lower-level intelligent agents, they also consider the weather and ground conditions as part of their analysis in order to rule out natural causes for the observed event.

Mid-level agents correlate and consolidate cloud identifications provided to them by lower level agents and are responsible for determining when a given cloud has been identified by more than one agent and then consolidating and correlating this multiple recognition of a cloud into a single instance. Mid-level intelligent agents are allowed to make a determination if a chemical or biological agent plume has been detected, if such a determination is made then a confidence value for the determination must also be made and transmitted in the DTD. Each mid-level intelligent agent continues its analysis on the data until it either can make a conclusive determination concerning the presence of a cloud or new data arrives from the sensor. If an assessment is made, then the intelligent agent computes a determination of the confidence value for the assessment. The confidence value can be determined using a look up table, a formula, or other means that takes into account the quality of the data. Then, the agent completes the DTD by filling in those portions for which it has data and then sends the DTD to all of the agents in the next level of the hierarchy—or posts the DTD to the blackboard.

TABLE 1

XML Document Type Definition Used by Intelligent Agents at the Hierarchy Top

```
<?XML version="1.0" encoding="UTF-8"?>
<!DOCTYPE DETECTION OUTPUT SYSTEM [
<!ELEMENT DETECTION OUTPUT
Attack occurring
Attack assessment confidence ?
Number of plumes ?
(Plume identifier
plume confidence
plume location
Main axis
Minor axis
Change in main axis
Change in minor axis
Direction of motion
Velocity of motion
Plume mean height
Plume maximum height
Change in plume height)*
>
<!ELEMENT    Attack occurring                (#PCDATA)>
<!ELEMENT    Attack assessment confidence    (#PCDATA)>
<!ELEMENT    Number of plumes                (#PCDATA)>
<!ELEMENT    Plume identifier                (#PCDATA)>
<!ELEMENT    plume confidence                (#PCDATA)>
<!ELEMENT    plume location                  (#PCDATA)>
<!ELEMENT    Main axis                       (#PCDATA)>
<!ELEMENT    Minor axis                      (#PCDATA)>
<!ELEMENT    Change in main axis             (#PCDATA)>
<!ELEMENT    Change in minor axis            (#PCDATA)>
<!ELEMENT    Direction of motion             (#PCDATA)>
<!ELEMENT    Velocity of motion              (#PCDATA)>
<!ELEMENT    Plume mean height               (#PCDATA)>
<!ELEMENT    Plume maximum height            (#PCDATA)>
<!ELEMENT    Change in plume height          (#PCDATA)>
</DETECTION OUTPUT>
```

At the top of the hierarchy lie the intelligent agents that have the responsibility for determining if an attack has occurred and for tracking a chemical or biological cloud or clouds once they are detected. The output for these agents is formatted according to the DTD shown in Table 1 above. The output from the highest level agents consists of a notification of whether or not a chemical or biological cloud plume has been detected, how many plumes are detected, a plume identifier, a plume location, a confidence factor for the detection of each plume, the major and minor axis for each plume, direction and velocity of each plume, and plume height. The attack occurring entry can have either a yes or no value, with a default value of no. The attack assessment confidence entry only occurs when the Attack occurring entry has a value of yes and gives a confidence value that an attack is occurring. The number of plumes entry provides the number of plumes detected and appears only when the Attack occurring entry has a value of yes. Then, for each plume, there is a plume identifier, a confidence factor value that the plume is a chemical or biological cloud, the plume's coordinates, the main and minor axis for the plume, the change in main and minor axis for this plume since the last report, the direction and velocity of motion for the plume, the mean and maximum height for the plume, and the change in plume height since the last report.

Figure 3:
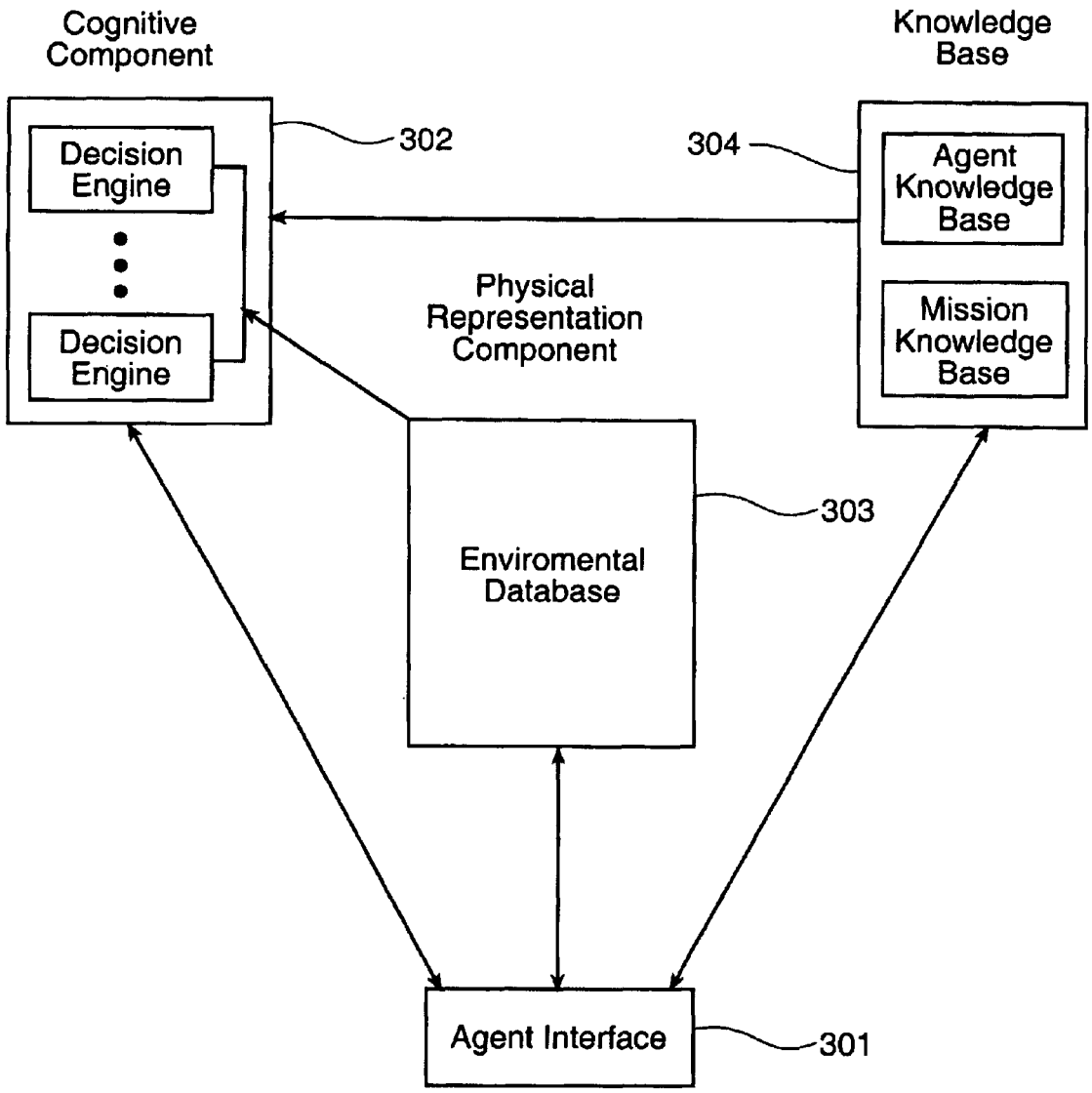
FIG. 3 shows an overall or gross architectural representation of an intelligent agent usable in embodiments of the invention.

As shown in FIG. 3, there are four major components within each intelligent agent in the invention: the Physical Representation Component, PRC, at 303, the Cognitive Component, CC, at 302, the Agent Interface, AI, at 301, and the Knowledge Base at 304. The PRC at 303 contains a model of the external environment, including terrain, sun position, moon position, and major bodies of water within the sensor's field of view. The PRC contains static environment information, such as information concerning terrain and the location of major bodies of water, semi-static environment information, such as information concerning weather and soil moisture content, and dynamic data, such as the reflectance of a cloud, soil temperature, and the Sun's position. The Knowledge Base at 304 contains two types of information. The first type of information is that related to the mission for the intelligent agent, that is, the exact tasking for the agent within the invention. The tasking is a description of the objective of the analysis to be performed by the agent and the inputs the agent should use to perform the analysis. The tasking determines the type of information the agent needs as an input and the information it can produce as an output. Information about the tasking is exchanged between the Mission Knowledge Base and the Agent Interface so that the Agent Interface can extract the information that the agent needs and so that feedback concerning the agent's performance can be placed into the Mission Knowledge Base for use by the Decision Engines in the Cognitive Component (at 302). The other type of information in the knowledge base is agent specific and holds the knowledge needed by each agent for it to perform its task. Information in this portion of the knowledge base helps the agent to analyze the information arriving from the PRC and also helps it to make assessments concerning the confidence in an assessment.

The Cognitive Component 302 of the intelligent agent contains one or more decision engines. The decision engines use the information contained in the Knowledge Base 304 and the information in the Physical Representation Component (which includes all incoming, dynamic data) to make its determination concerning the existence of a chemical or biological cloud and/or the motion of a cloud. The Agent Interface 301 is responsible for gathering data from the hierarchy or blackboard and providing the information to the PRC and Mission Knowledge Base and is also responsible for placing information into the hierarchy or placing it onto the blackboard after it is output from the Cognitive Component.

Figure 4:
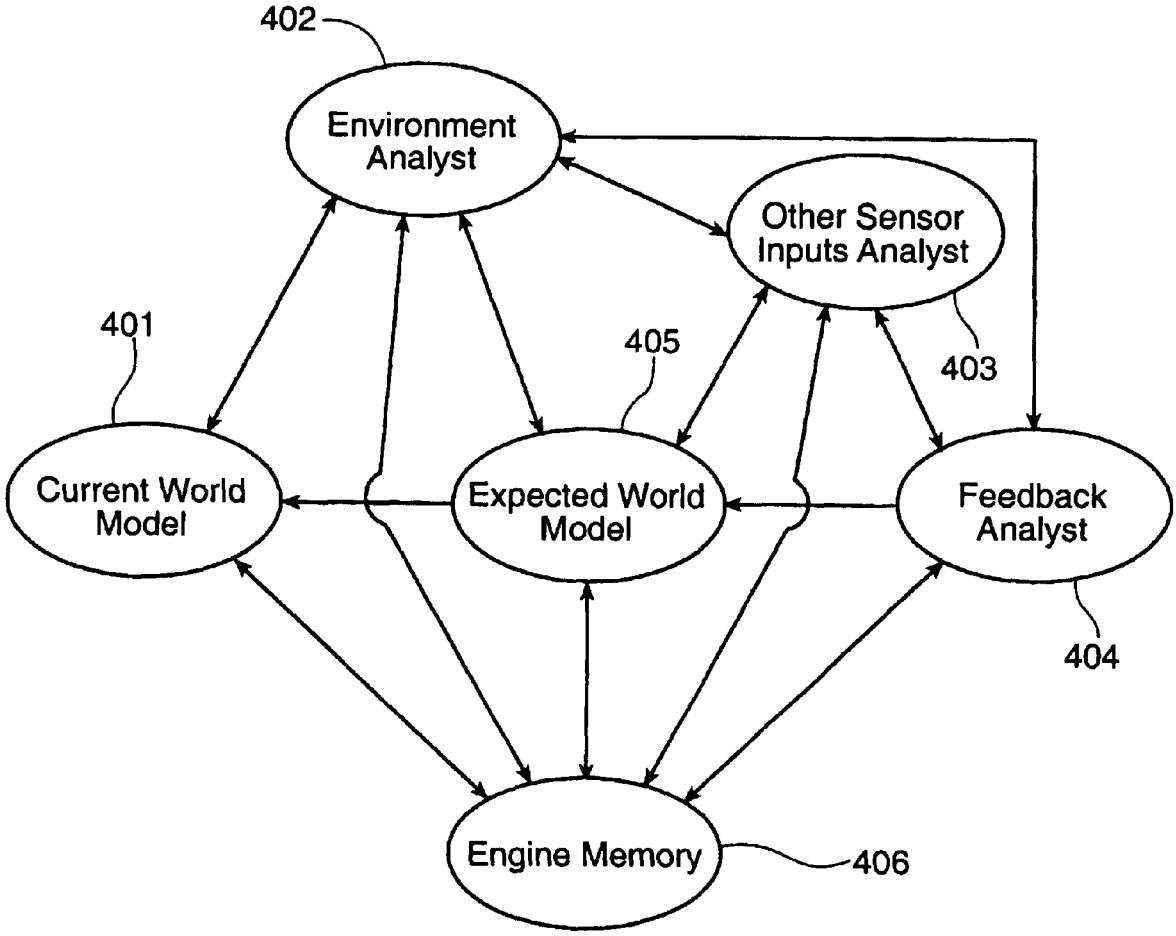
FIG. 4 shows a more detailed representation of an intelligent agent usable in embodiments of the invention.

The architecture for each agent in the invention consists of a reasoning mechanism, specialized knowledge, communication facilities, and knowledge base access methods. Each agent can be, in turn, composed of multiple agents so that the complexity of a given agent's operation can be hidden from all other agents and the communication interface between agents remains the same regardless of the internal complexity of the agent. FIG. 4 contains a detailed representation of the architecture of a single intelligent agent. As shown in this FIG., each agent's decision engine has six main components, components which are themselves agents and form an agent society, a Current World Model 401, an Expected World Model 405, an Environment Analyst 402, an Other Sensor Inputs Analyst 403, a Feedback Analyst 404, and an Engine Memory 406. All six of these components are able to send and receive data and analyses from any other component of a decision engine. Within a decision engine, the Current World Model component contains a description of the state of the environment that has been assembled by the agent based upon its inputs derived from its sensors. This current description is compared against the Expected World Model component to detect changes in the world and unexpected events.

Figure 7:
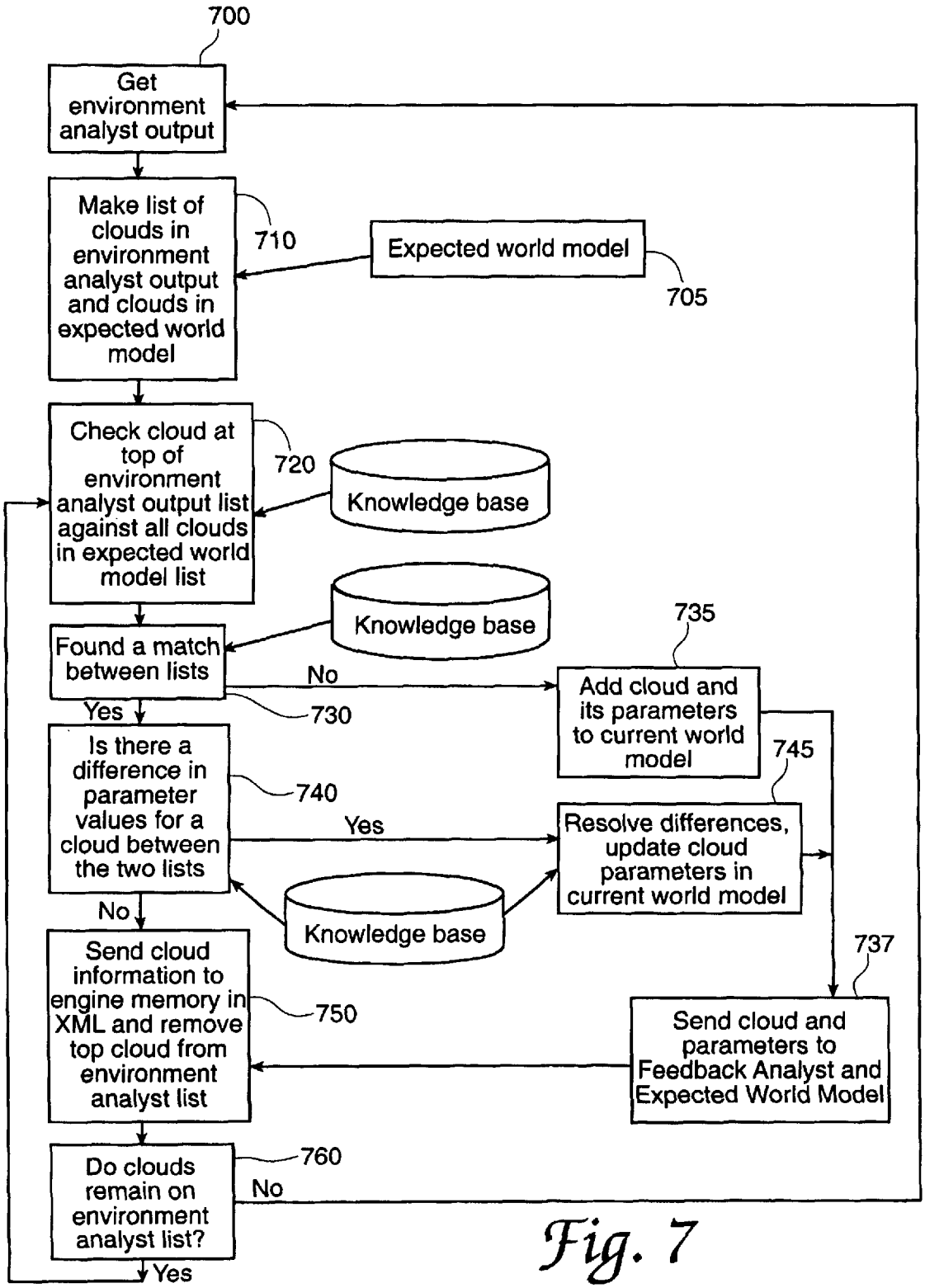
FIG. 7 shows operation of a Current World Model agent.
Figure 8:
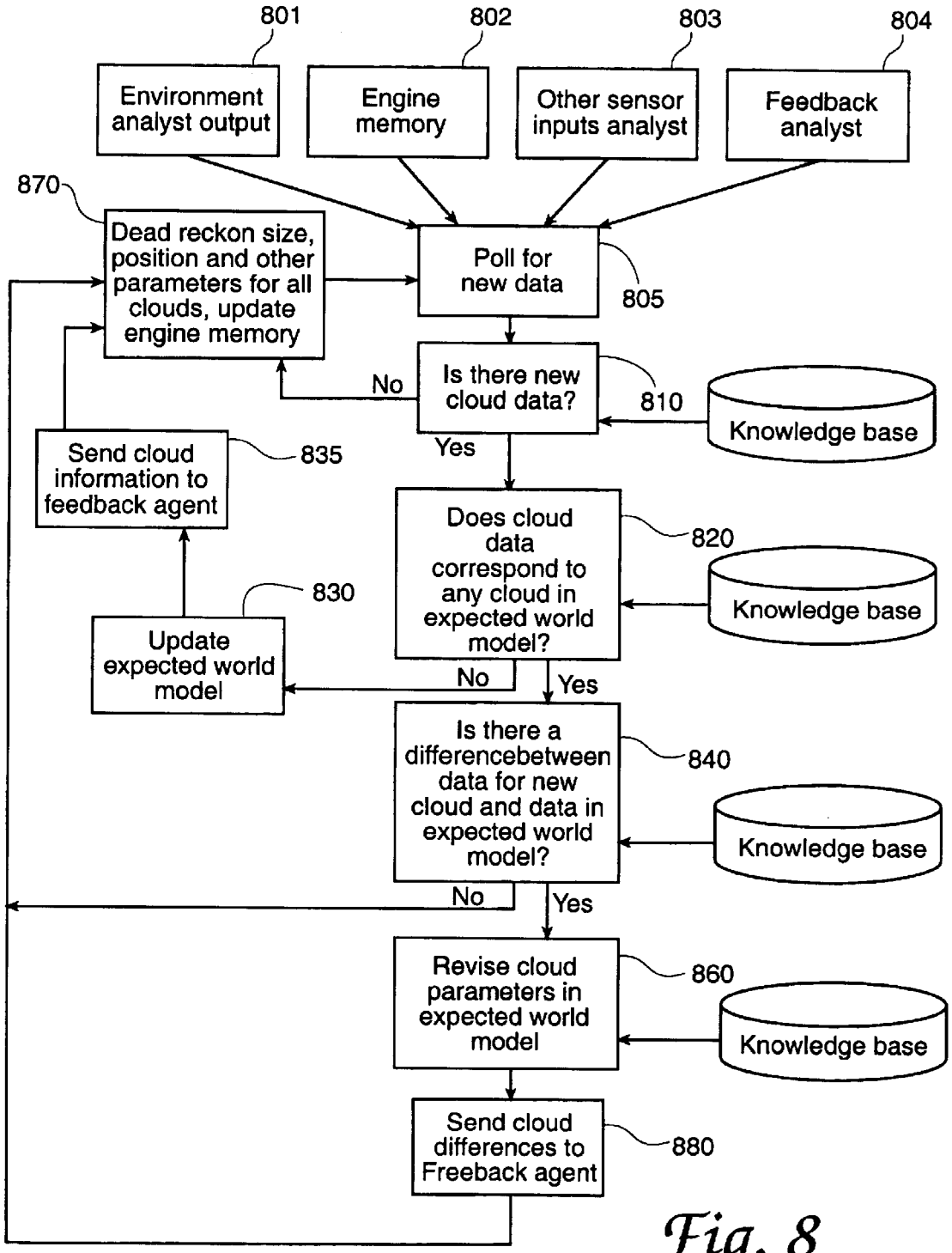
FIG. 8 shows operation of a Expected World Model agent.

By way of explanation, the term "world model", recited here and in connections with FIG. 7 and FIG. 8 of the drawings for examples, is an artificial intelligence term and refers to the computer-stored and maintained representation of the contents of the volume within a sensor's field of view and by extension to the field of view for all of the sensors for the present invention system. No model of the world as a globe is intended or maintained. The expected world model is the agent's estimate of the anticipated state of the volume within the sensor's field of view.

The Environment Analyst component uses information contained in the world models and information provided by the Other Sensor Inputs Analyst component to determine if a cloud (as indicated by a segment with certain properties) exists in the environment and to track a cloud if it does exist based upon the individual intelligent agent's inputs. The Environment Analyst also generates feedback to be sent to other agents in the agent hierarchy in the invention. Feedback can consist of information such as there are too many segments (or chemical or biological cloud plumes) being provided, do not forward raw sensor data, increase the number of segments, or any other performance factors. The output from the Environment Analyst that is sent to other intelligent agents is written in XML according to the DTD presented below. The Other Sensor Inputs Analyst component is responsible for accepting data provided by other intelligent agents and for using it to help the Environment Analyst component to determine if a chemical or biological cloud exists and to enable the tracking of a chemical or biological cloud.

The Feedback Analyst component takes information provided as feedback from other intelligent agents in the hierarchy and provides it to the other components in its decision engine except for the Current World Model. The Feedback Analyst filters the feedback to extract the feedback appropriate to its particular engine and also to its current state. The feedback allows the decision-making components of an engine to refine their operation based upon the perceived utility of their outputs by other intelligent agents in the invention. The information that comes into the Feedback Analyst is written in XML according to DTD presented below. The Engine Memory component maintains a record of all of the decisions and outputs of the other six components as well as a record of world models so that they can draw upon the memory to make future decisions. The memory holds information like the number of segments detected for each type of segmentation performed, time-stamped feedback, location of correlations that were detected, prior weather conditions and significant aspects of prior world models formed by the agent.

Several factors support our decision to use XML for communication between intelligent agents in the invention. First, XML is a flexible approach to formatting. The XML capability to define and use custom tags and the minimal requirements imposed by the language permit expression of the transmission format robustly within the boundaries of the language. Second, XML is widely used and is standardized; therefore, the basic components of the language are stable and well understood. Third, XML is precise, it has a well defined set of rules for describing a document and for ordering the contents of a document but does not specify semantics. As a result, XML provides the basis for developing a common data format that is robust in the face of data corruption, self-describing in terms of tag meaning, and extendable to accommodate unforeseen data requirements. Fourth, because XML supports the definition of custom tag-sets and custom structures that are completely contained within the document, an XML-based specification can be automatically searched and categorized by computer programs instead of manually. Finally, XML supports the creation and use of multipart, distributed documents and supports interchange of data between agents and agent societies. Additional information relating to the XML communication is included in the appendix to this specification. Each agent's output is contained within a Document Type Definition (DTD) for the invention. The DTD for all of the agents in the invention is presented in Table 2 below. This DTD is used by each agent to communicate with other agents in the hierarchy and between agents in a society. Vocabulary tags and assigned meanings for certain intelligent agent outputs in Table 2 appear in Table 3 also shown below.

TABLE 2

XML Document Type Definition

```
<?XML version="1.0" encoding="UTF-8"?>
<!DOCTYPE INTELLIGENT_AGENT_OUTPUT SYSTEM [
<!ELEMENT INTELLIGENT_AGENT_OUTPUT
>
<!ELEMENT  Attack occurring                          (#PCDATA)>
<!ELEMENT  Attack concluded                          (#PCDATA)>
<!ELEMENT  Number of sensors                         (#PCDATA)>
<!ELEMENT  Sensor type                               (#PCDATA)>
<!ELEMENT  Raw sensor output                         (#PCDATA)>
<!ELEMENT  Boundary for sensor footprint on surface  (#PCDATA)>
<!ELEMENT  Sensor frequency range                    (#PCDATA)>
<!ELEMENT  Sensitivity of sensor                     (#PCDATA)>
<!ELEMENT  Resolution of sensor                      (#PCDATA)>
<!ELEMENT  Sensor altitude                           (#PCDATA)>
<!ELEMENT  Sensor position                           (#PCDATA)>
<!ELEMENT  Orientation of sensor                     (#PCDATA)>
<!ELEMENT  Raw sensor output                         (#PCDATA)>
<!ELEMENT  Composite assessment                      (#PCDATA)>
<!ELEMENT  Composite assessment confidence level     (#PCDATA)>
<!ELEMENT  Number of decision engine assessments     (#PCDATA)>
<!ELEMENT  Decision engine assessment                (#PCDATA)>
<!ELEMENT  Decision engine assessment confidence level (#PCDATA)>
<!ELEMENT  Number of input assessments               (#PCDATA)>
<!ELEMENT  Input assessment value                    (#PCDATA)>
<!ELEMENT  Input assessment confidence               (#PCDATA)>
<!ELEMENT  Feedback                                  (#PCDATA)>
<!ELEMENT  Number of clouds                          (#PCDATA)>
<!ELEMENT  Cloud identifier                          (#PCDATA)>
<!ELEMENT  Cloud confidence                          (#PCDATA)>
<!ELEMENT  Cloud location                            (#PCDATA)>
<!ELEMENT  Cloud altitude                            (#PCDATA)>
<!ELEMENT  Main axis                                 (#PCDATA)>
<!ELEMENT  Minor axis                                (#PCDATA)>
<!ELEMENT  Change in main axis                       (#PCDATA)>
<!ELEMENT  Change in minor axis                      (#PCDATA)>
<!ELEMENT  Cloud mean height                         (#PCDATA)>
<!ELEMENT  Cloud maximum height                      (#PCDATA)>
<!ELEMENT  Change in cloud mean height               (#PCDATA)>
<!ELEMENT  Cloud direction of motion                 (#PCDATA)>
<!ELEMENT  Cloud velocity of motion                  (#PCDATA)>
<!ELEMENT  Millimeter wave penetration               (#PCDATA)>
<!ELEMENT  Average infrared emission for the cloud   (#PCDATA)>
<!ELEMENT  Cloud reflectance                         (#PCDATA)>
<!ELEMENT  Cloud humidity                            (#PCDATA)>
<!ELEMENT  Cloud temperature                         (#PCDATA)>
<!ELEMENT  Number of plumes                          (#PCDATA)>
<!ELEMENT  Plume identifier                          (#PCDATA)>
<!ELEMENT  Plume confidence                          (#PCDATA)>
<!ELEMENT  Plume location                            (#PCDATA)>
<!ELEMENT  Plume altitude                            (#PCDATA)>
<!ELEMENT  Main axis                                 (#PCDATA)>
<!ELEMENT  Minor axis                                (#PCDATA)>
<!ELEMENT  Change in main axis                       (#PCDATA)>
<!ELEMENT  Change in minor axis                      (#PCDATA)>
<!ELEMENT  Plume mean height                         (#PCDATA)>
<!ELEMENT  Plume maximum height                      (#PCDATA)>
<!ELEMENT  Change in plume mean height               (#PCDATA)>
<!ELEMENT  Direction of motion                       (#PCDATA)>
<!ELEMENT  Velocity of motion                        (#PCDATA)>
<!ELEMENT  Plume reflectance                         (#PCDATA)>
```

TABLE 2-continued

XML Document Type Definition

```
<!ELEMENT  Plume humidity                            (#PCDATA)>
<!ELEMENT  Plume temperature                         (#PCDATA)>
<!ELEMENT  Ambient humidity                          (#PCDATA)>
<!ELEMENT  Ambient air temperature                   (#PCDATA)>
<!ELEMENT  Natural clouds present                    (#PCDATA)>
<!ELEMENT  Surface moisture                          (#PCDATA)>
<!ELEMENT  Surface temperature                       (#PCDATA)>
<!ELEMENT  Sun position                              (#PCDATA)>
<!ELEMENT  Moon position                             (#PCDATA)>
<!ELEMENT  Increase number of segments               (#PCDATA)>
<!ELEMENT  Decrease number of segments               (#PCDATA)>
<!ELEMENT  Forward all raw sensor data               (#PCDATA)>
<!ELEMENT  Do not forward raw sensor data            (#PCDATA)>
<!ELEMENT  Wind direction                            (#PCDATA)>
<!ELEMENT  Wind velocity                             (#PCDATA)>
<!ELEMENT  Elapsed time since event began            (#PCDATA)>
<!ELEMENT  Number of natural clouds                  (#PCDATA)>
<!ELEMENT  Natural cloud id                          (#PCDATA)>
<!ELEMENT  Natural cloud location                    (#PCDATA)>
<!ELEMENT  Natural cloud altitude                    (#PCDATA)>
<!ELEMENT  Natural Cloud Main axis                   (#PCDATA)>
<!ELEMENT  Natural Cloud Minor axis                  (#PCDATA)>
<!ELEMENT  Natural Cloud assessment confidence       (#PCDATA)>
>
</ INTELLIGENT_AGENT_OUTPUT>
```

Table 3 provides the definition for each tag used in the DTD for the invention.

TABLE 3

Vocabulary Tags and Assigned Meanings for Certain Intelligent Agent Outputs

| TAG | MEANING |
|---|---|
| Attack occurring | Signal that an attack has been detected, nominal value is false |
| Attack concluded | Signal that attack has concluded, signal to reset all timers and begin scanning for new attack, nominal value is true |
| Number of sensors | Number of sensors used to make the assessment reported in the current report |
| Sensor type | Type of sensor used to provide an assessment input |
| Boundary for sensor footprint on the surface | Latitude and longitude of each corner of the rectangle for the sensor footprint or the latitude and longitude of the center of the circle of the footprint and the circle's radius; defines the boundary of the world model volume for a sensor |
| Sensor frequency range | Operational range of the sensor, from lowest effective frequency to highest effective frequency used by the sensor for this report. |
| Resolution of sensor | In square meters |
| Sensor altitude | Given in meters above mean sea level |
| Sensor position | Given in right ascension and declination |
| Orientation of sensor | Relative to prime meridian and equator |
| Raw sensor output | Values produced by a sensor |
| Composite assessment | Overall assessment by the intelligent agent that whether a chemical or biological agent plume is present |
| Composite assessment confidence level | Confidence level of the intelligent agent that its assessment of the presence of a chemical or biological agent plume is correct |

TABLE 3-continued

Vocabulary Tags and Assigned Meanings for Certain Intelligent Agent Outputs

| TAG | MEANING |
|---|---|
| Number of decision engine assessments | Number of assessments based on the computations of a single decision engine that a chemical or biological attack is occurring included in this report |
| Decision engine assessment | Assessment of the decision engine whether a chemical or biological agent plume is present |
| Decision Engine assessment confidence level | Confidence value for the assessment of the decision engine whether a chemical of biological agent plume is present |
| Number of input assessments | Number of input assessments used by the intelligent agent to make its computations |
| Input assessment value | Value of an input assessment used by the intelligent agent to make its computations |
| Input assessment confidence | Confidence value attached to the value of an input assessment used by the intelligent agent to make its computations |
| Feedback | Tag to indicate the presence of feedback from a higher level in the hierarchy |
| Number of clouds | Number of clouds that have not been identified as either a chemical or biological plume or natural cloud in this report |
| Cloud identifier | Unique identifier assigned to a cloud by an intelligent agent |
| Cloud confidence | Confidence level value that a cloud was detected |
| Cloud location | Latitude and longitude of the cloud |
| Cloud altitude | Given in meters above mean sea level |
| Main axis | The long axis of the plume |
| Minor axis | The short axis of the plume |
| Change in main axis | Change in length of main axis since last report |
| Change in minor axis | Change in length of minor axis since last report |
| Cloud mean height | Mean height of the cloud, in meters above the surface of the Earth |
| Cloud maximum height | Maximum height of the cloud, in meters above the surface of the Earth |
| Change in cloud mean height | Change in mean height of the cloud since last report |
| Cloud direction of motion | Direction of the movement of the center of the cloud relative to true north |
| Cloud velocity of motion | Velocity of the center of the cloud in kilometers per hour |
| Millimeter wave penetration | Whether a radar can penetrate the cloud to the ground |
| Average infrared emission for the cloud | |
| Cloud reflectance | The ratio of the amount of electro-magnetic radiation that reflects off the surface of the cloud to the amount of radiation that strikes the cloud |
| Cloud humidity | Given as percent relative humidity |
| Cloud temperature | Given in degrees centigrade |
| Number of plumes | Number of chemical and biological plumes reported in this report |
| Plume identifier | Unique identifier assigned to a plume by an intelligent agent |
| Plume confidence | Confidence value that the plume assessment is correct |
| Plume location | Latitude and longitude of the center of the plume. |
| Plume altitude | Given in meters above mean sea level |
| Main axis | The long axis of the plume |
| Minor axis | The short axis of the plume |

TABLE 3-continued

Vocabulary Tags and Assigned Meanings for Certain Intelligent Agent Outputs

| TAG | MEANING |
|---|---|
| Change in main axis | Change in length of main axis since last report |
| Change in minor axis | Change in length of minor axis since last report |
| Plume mean height | Mean height of the plume, in meters above the surface of the Earth |
| Plume maximum height | Maximum height of the plume, in meters above the surface of the Earth |
| Change in plume mean height | Change in mean height of the plume since last report |
| Direction of motion | Direction of the movement of the center of the plume relative to true north |
| Velocity of motion | Velocity of the center of the plume in kilometers per hour |
| Plume reflectance | The ratio of the amount of electro-magnetic radiation that reflects off the surface of the cloud to the amount of radiation that strikes the cloud |
| Plume humidity | Given as percent relative humidity |
| Plume temperature | Temperature of a plume given in degrees centigrade |
| Ambient humidity | Given as percent relative humidity |
| Ambient air temperature | Temperature of the air, given in degrees centigrade |
| Natural clouds present | Whether or not clouds are present in the atmosphere in the same area that a sensor is watching, given as a true or false value |
| Surface moisture | Amount of moisture measured on the surface |
| Surface temperature | Temperature of Earth's surface |
| Sun position | Given in right ascension and declination |
| Moon position | Given in right ascension and declination |
| Increase number of segments | Directive to a lower level agent to increase the number of segments that it identifies, usually accomplished by using some form of finer grained segmentation values |
| Decrease number of segments | Directive to a lower level agent to decrease the number of segments that it identifies, usually accomplished by using some form of coarser grained segmentation values |
| Forward all raw sensor data | Directive to a lower level agent to place the raw sensor values into the intelligent agent hierarchy. |
| Do not forward all raw sensor data | Directive to a lower level agent to stop placing the raw sensor values into the intelligent agent hierarchy. |
| Wind direction | Direction the wind is coming from, given in relation to true north |
| Wind velocity | Velocity of the wind, given in kilometers/hour |
| Elapsed time since event began | Time in seconds since the intelligent agent first detected a chemical or biological agent plume |
| Number of natural clouds | Total number of natural clouds reported in this report |
| Natural cloud id | Unique identifier assigned to a natural cloud by an intelligent agent |
| Natural cloud location | Latitude and longitude of the center of the natural cloud. |
| Natural cloud altitude | Given in meters above mean sea level |
| Natural Cloud Main axis | The long axis of the natural cloud |
| Natural Cloud Minor axis | The short axis of the natural cloud |
| Natural Cloud assessment confidence | Confidence value that the natural cloud assessment is correct |

Figure 5:
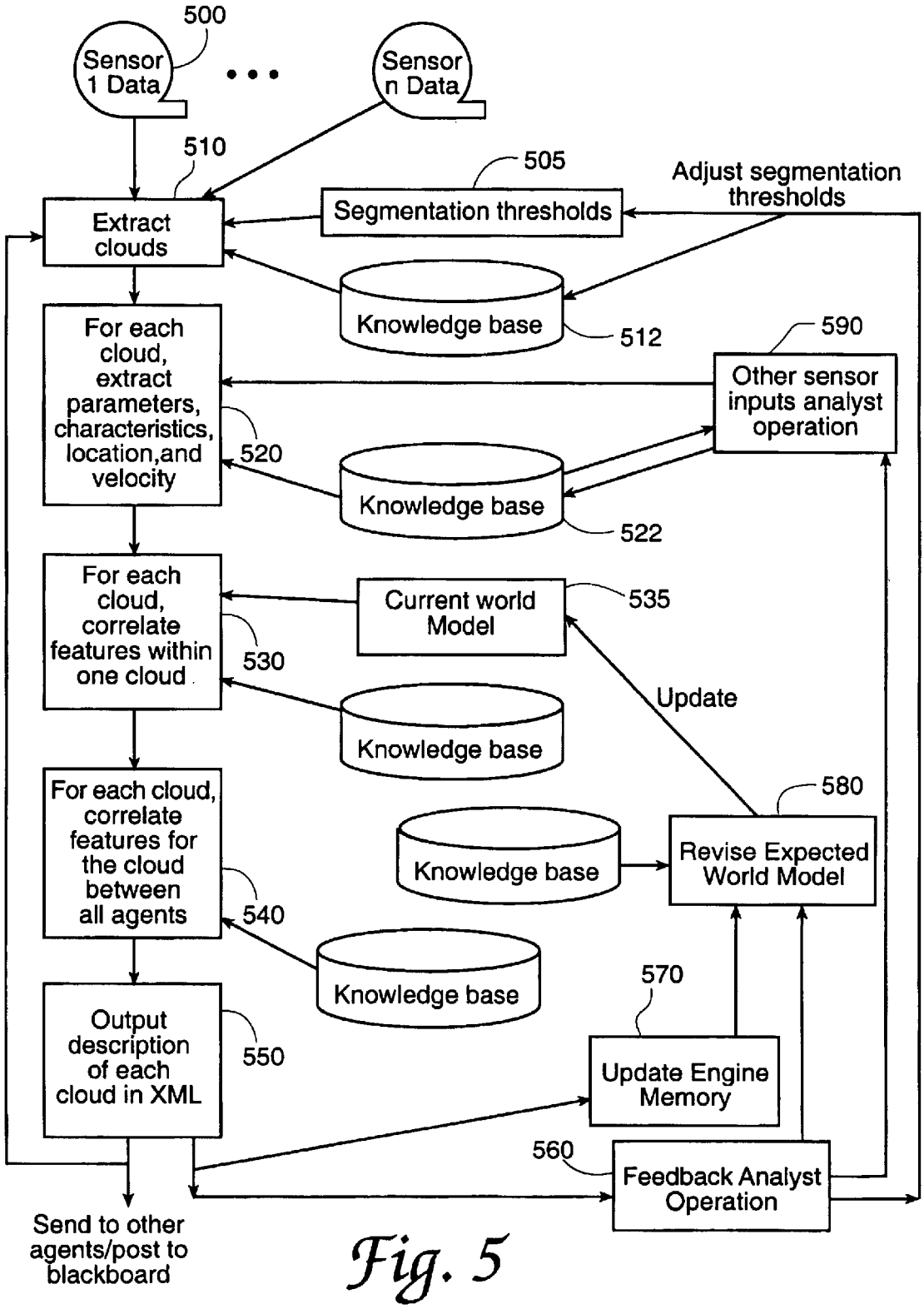
FIG. 5 shows the basic data processing flow for an embodiment of the invention including the steps and decisions made to locate and track a chemical or biological agent cloud.

FIG. 5 in the drawings shows the basic flow for the processing of data within the invention among all of the agents in a single agent society. The FIG. 5 agent society is composed of agents of the FIG. 4 type having a common tasking to identify and/or track one or more different types of chemical or biological clouds. The FIG. 5 agent society operates as follows. Communication between agents is accomplished using XML and data segmentation is accomplished with the use of one or more standard image segmentation techniques. At step 500 in FIG. 5 the data from the sensors connected to the agent under discussion is acquired and at 510 the clouds within the view range of the sensors are extracted using the segmentation information at 505 and information from the agent knowledge base 512. The knowledge base information is stored in the agent and comes from data gathered from subject matter experts. Similar storage and sourcing is used for the other knowledge bases in FIG. 5 through FIG. 10 herein. At 520 in FIG. 5, using information from the knowledge base 522, parameters, and data about each cloud is determined; this information includes data such as location, size, velocity, density, and rate of change of expansion of the cloud. At 530, the features for each cloud are correlated within the cloud to insure they are consistent using information from the current world model at 535 and information in the knowledge base. At 540, the information for each cloud is correlated between all of the agents using information in the knowledge base. At 550, the description for each cloud is output in XML to other agents and/or to the later discussed blackboard. This information is also sent to the engine memory at 570 and the feedback analyst at 560. The information in the engine memory at 570 and the feedback analyst at 560 is sent to the expected world model where it is used in conjunction with the knowledge base to revise the expected world model at 580 and to update the current world model at 535. The information from the feedback analyst at 560 is also sent to the other sensor input analyst at 590 where it is used in conjunction with the information in the knowledge base to determine changes to be made to the knowledge base data used by other agenda to identify clouds and determine their parameters. The data output from 560 is also used to adjust the segmentation thresholds used at 505 and the content of the knowledge base. Processing continues as long as the sensors continue to supply input data.

Figure 6A:
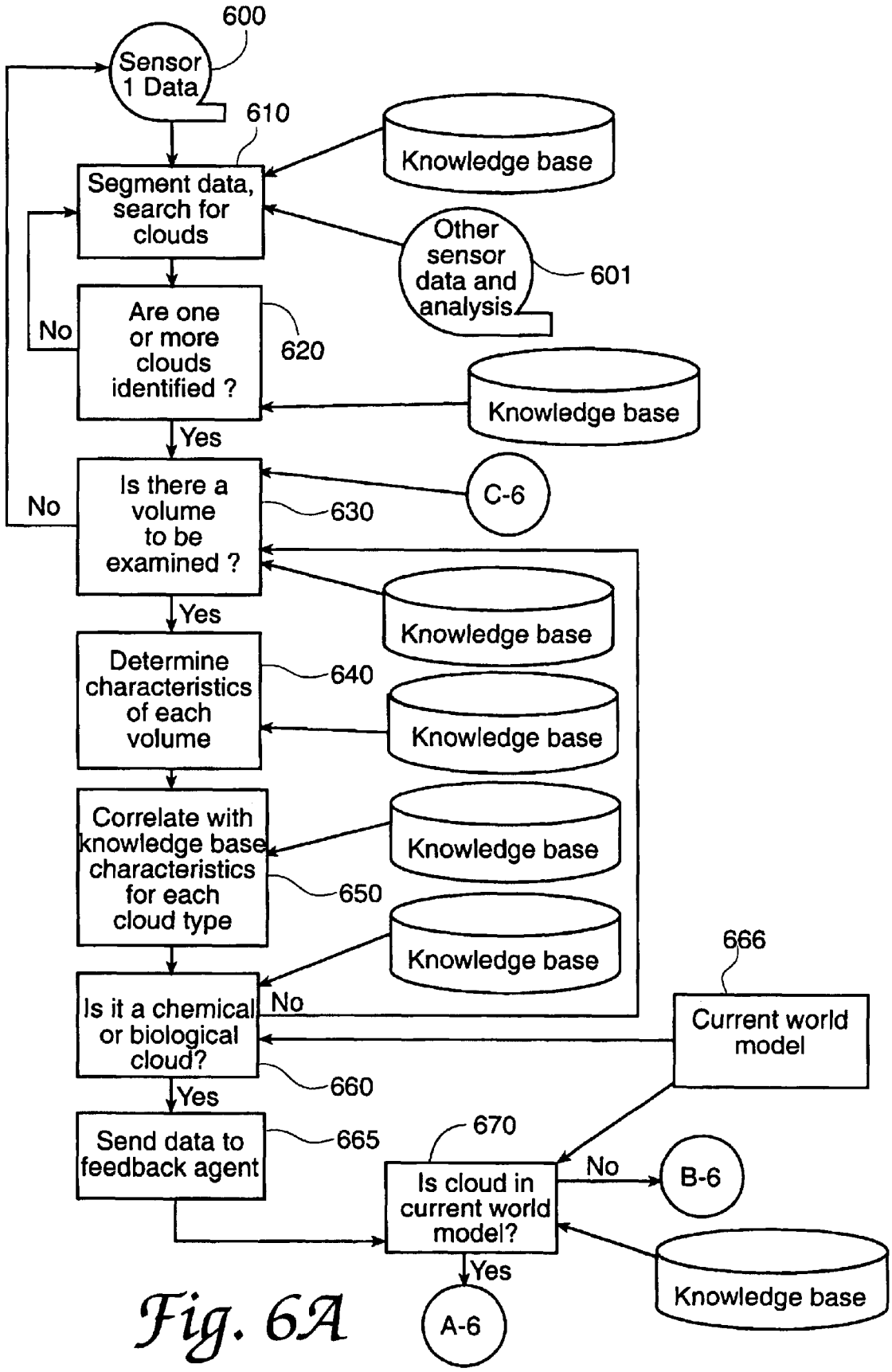
FIG. 6A shows a first part of operation of an Environment Analyst agent.
Figure 6B:
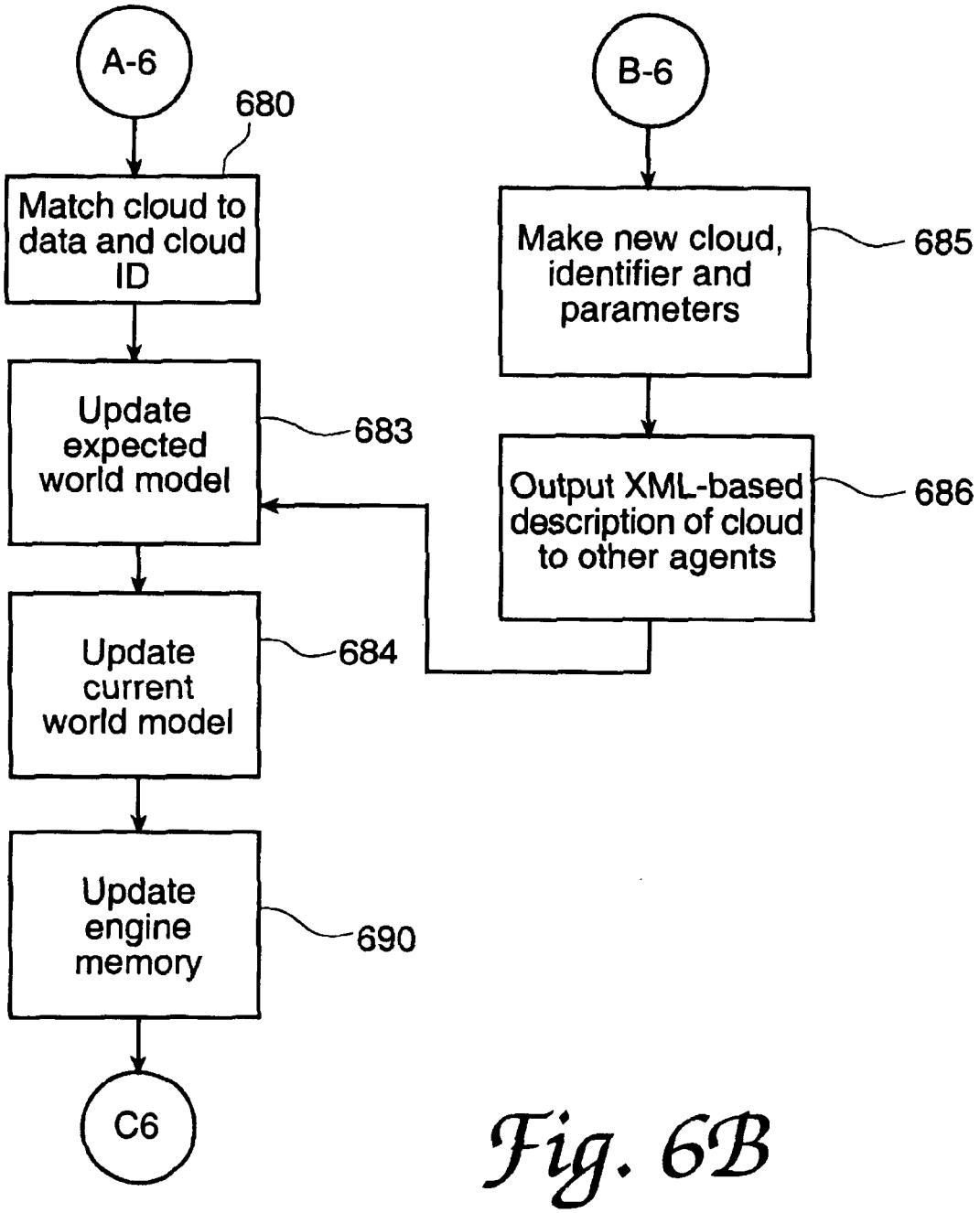
FIG. 6B shows a second part of operation of an Environment Analyst agent.

FIG. 6, which is made up of the parts FIG. 6A and FIG. 6B, shows the operation of the Environment Analyst intelligent agent. The Environment Analyst uses information contained in the current world model, information provided by sensors, and information provided by the Other Sensor Inputs Analyst to determine if a cloud (as indicated by a segment with certain properties) exists in the environment and also to track a cloud. The Environment Analyst also generates feedback sent to other agents in the agent hierarchy and in its society in the invention. Feedback can consist of information such as there are too many segments (or chemical or biological cloud plumes) being detected or provided, do not forward raw sensor data, increase the number of segments, or any other performance factors, parameters, or directives. The output from the Environment Analyst is sent to other intelligent agents using XML. The Environment Analyst operates as follows. Sensor data ia provided at 600 and is sent to the search function at 610 where the data is segmented to extract clouds using information in the knowledge base and data from other sensors and their analysis as provided at 601. The results of the segmentation process is sent to the decision at 620 where the agent determines if one or more clouds have been located using information in the knowledge base. If no clouds are identified, processing return to step 600. If clouds are located, processing proceeds to 630 where information from the knowledge base is used to determine if there is a volume to be examined. If there is not a volume, processing returns to 600, otherwise processing proceeds to the determination at 640 where information from the knowledge base is used to determine the characteristics of the volume. Processing then goes on to the correlation at 650 where information from the knowledge base is used to correlate information to determine the characteristics for each cloud.

Processing then advances to step 660 where information from the knowledge base and the current world model is used to determine if the cloud is a chemical or biological cloud. If it is determined that the cloud is not a chemical or biological cloud, processing returns to 630; otherwise processing advances to the step 665 where the data for the cloud is sent to the Feedback agent. In step 670, the Environment Analyst uses information from the current world model and knowledge base to determine if the cloud is in the current world model; if not then processing goes to the function at 685. At 685, a new cloud identifier is created along with its parameters and processing advances to 686 where the description of the cloud and its data is output in XML and sent to the other agents; processing then goes to 683 for model updating. If at 670 it is determined that the cloud is in the current world model, processing advances to 680 where the cloud and its data is matched to the cloud in the current world model and at 683 the expected world model is updated. Processing then advances to 683 where the current world model and other models are updated and then to 690 where the engine memory is updated. Processing then returns to 630 for repetitions until no more volumes remain to be examined.

FIG. 7 in the drawing shows the operation of the Current World Model agent. Within a decision engine, the Current World Model is an intelligent agent and contains a description of the state of the environment that is assembled by the agent based upon data from its sensors and other agents. The FIG. 7 Current World Model agent operates as follows. At 700, the agent retrieves the latest Environment Analyst's output data. This information and the Expected World Model at 705 are used at 710 to make two lists, one list composed of clouds in the environment analyst's output and the other list composed of clouds in the expected world model's output. At 720, the cloud at the top of the environment analyst's output list is compared against all of the clouds in the list formed from the output from the expected world model using information in the knowledge base to aid in the comparison. At 730, if a match is not found for a cloud in the two lists using information contained in the knowledge base then a new cloud has been located and therefore processing advances to 735. At 735, the new cloud and its parameters are added to the current world model and processing advances to 737. If, at 730 a match is found for a cloud then processing proceeds to 740 where it is determined, using information in the knowledge base, if the cloud appears in both lists but the parameters for the cloud have a difference.

If a 740 the cloud appears in both lists but there is a difference in parameters then processing advances to 745; at 745 the cloud's parameters are resolved using information in the knowledge base and then the cloud's parameters are updated in the current world model using the resolved parameter information. From 745, processing then advances to 737. At 737, the cloud and its parameters are sent to the Feedback Analyst agent and Expected World Model agent. From 737, processing advances to 750. If at 740 there is no difference in the cloud's parameters; which means that the dead reckoned cloud and its parameter values computed for the expected world model agent match the values observed in the real world by the environment analyst, then the current world model agent has found a complete match and no changes need to be made to the current world model since it is accurate; therefore processing advances to 750, where the cloud and all of its parameter information are sent to the engine memory, and the top cloud (the one that was just examined) is removed from the environment analyst output list. Processing then advances to 760, where it is determined whether clouds remain in the environment analyst's output list. If clouds remain, then processing returns to 720 where the next cloud on the list is examined. If clouds do not remain then processing of the latest output from the environment analyst is complete so processing returns to 700 where the next set of output data from the environment analyst is obtained.

FIG. 8 show the operation of the Extended World Model agent. Within a decision engine, the Expected World Model is maintained by an intelligent agent and contains a description of the state of the environment that has been computed by the agent based upon its dead reckoning of cloud parameters based upon inputs derived from its sensors and from other agents. In the FIG. 8 agent, the Expected World Model and Current World model are compared to detect differences and to detect unexpected events. The Expected World Model agent operates as follows. At 805, the agent polls for data from the Environment Analyst, Engine memory, the Other sensor inputs analyst, and feedback at 801, 802, 803, and 804 respectively. Once new data is received, processing advances to 810 where the agent determines if there is new cloud data by using the information received and information in the knowledge base. If no new cloud data is received, processing advances to 870 where the agent dead reckons the size, the position, and all other parameters for all its clouds and sends an update to the engine memory. If there is new cloud data at 810, processing advances to 820 where the agent uses information in the knowledge base to determine if the new cloud data corresponds to any cloud in the expected world model.

If the cloud and its data do not correspond to any cloud in the Expected World Model, then processing proceeds to 830 where the expected world model is updated and processing then proceeds to 835 where the cloud information is sent to the feedback agent. If the cloud and its data do correspond to data in the expected world model processing proceeds to 840 where the agent uses information in its knowledge base to determine if there is a difference between the new data for the cloud and the data for the cloud already in the expected world model. If there is no difference, processing advances to 870. If there is a difference, processing advances to 860 where the agent uses information in its knowledge base and the cloud's new data to revise the cloud's parameters in the expected world model. From 860, processing in the agent proceeds to 880 where the differences between the new parameters and the parameters in the expected world model are sent to the feedback agent in XML format. From 880, processing advances to 870. From 870 processing advances to 805 where the agent polls for new data.

Figure 9:
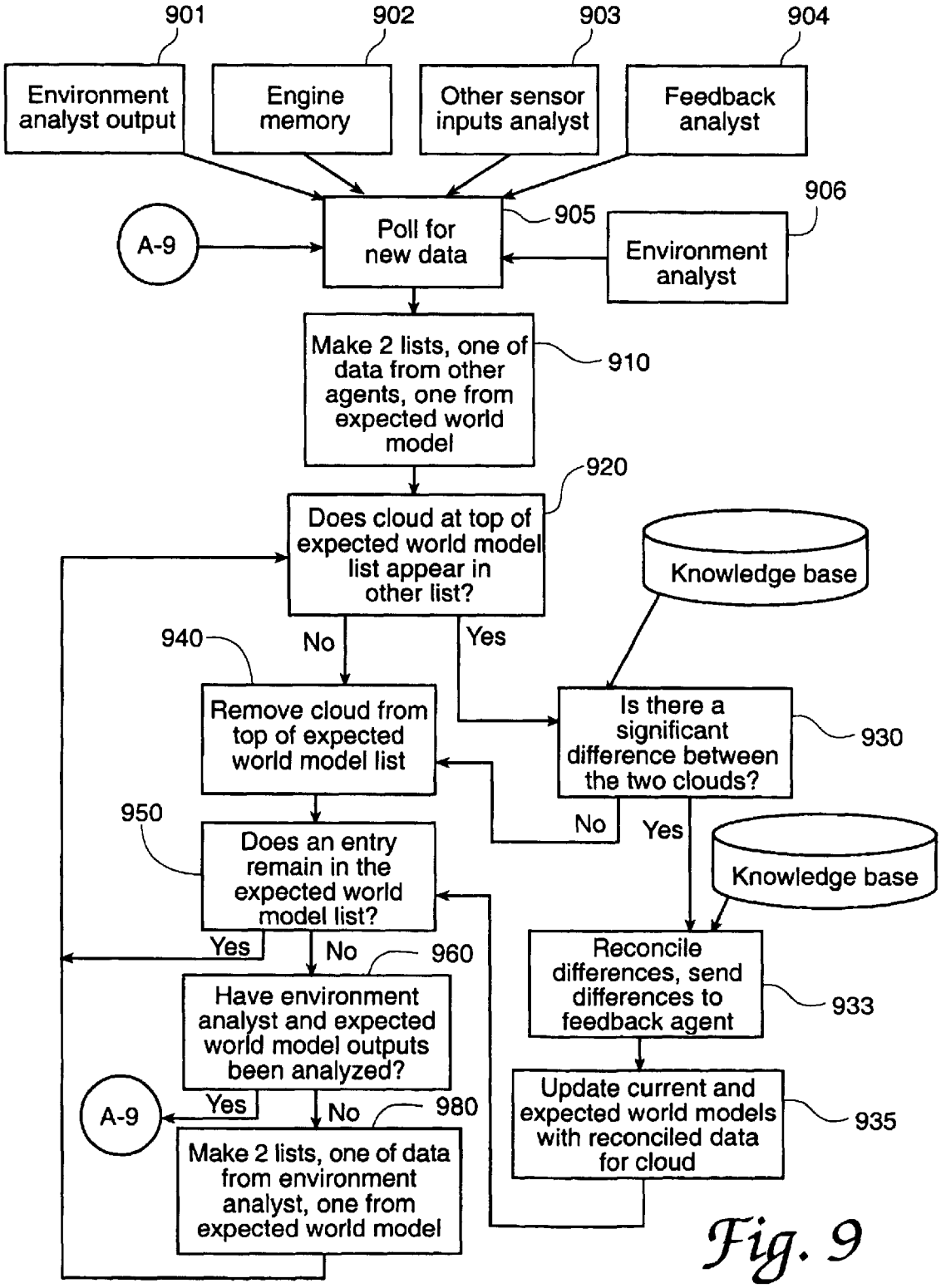
FIG. 9 shows operation of a Other Sensors Input Analyst.

FIG. 9 shows the operation of the Other Sensors Input Analyst. The Other Sensor Inputs Analyst is an intelligent agent and is responsible for accepting data provided by other intelligent agents and the engine memory and for using the data to help the Environment Analyst component to determine if a chemical or biological cloud exists, to detect errors in the world model, and to enable the tracking of a chemical or biological cloud. The Other Sensor Inputs Analyst agent operates as follows. At 905, the agent polls for new data from other agents, i.e., from Engine memory, the expected world model, the feedback analyst, and the environment analyst at 901, 902, 903, 904, and 906 respectively. Once new data is received, processing advances to 910 where the agent makes two lists, one containing all of the data from the other agents and the other list containing all of the data in the expected world model. Processing then advances to 920, where the agent takes the cloud at the top of the expected world model and determinate if this cloud appears in the other list. If the cloud appears in both lists, processing advances to 930, otherwise processing advances to 940. At 930, the agent uses the information in its knowledge base to determine if there is a significant difference in the information about the cloud on the two lists. If there is a significant difference at 930, processing advances to 933, where the agent uses information in its knowledge base to reconcile the differences and sends the information about the reconciliation to the feedback agent; processing then advances to 935 where the agent updates the current and expected world models with the reconciled data for the cloud and then processing advances to 950.

If at 930 there is not a significant difference in cloud data then processing advances to 940, where the agent removes the cloud and its information from the top of the expected world model list. Processing then advances to 950, where the agent determines if an entry remains in the expected world model list. If an entry remains in the list, clouds remain to be processed and so processing returns to 920. If at 950 an entry does not remain in the Expected World Model list, then processing advances to 960, where the agent determines if data from the environment analyst and expected world model have been analyzed. If they have, then processing returns to 905 where the agent polls for new data. If at 960 it is determined that data from the environment analyst and expected world model have not been analyzed, then the environment analyst data has not been examined, so processing advances to 980. At 980, the agent makes two lists, one containing all of the data from the environment analyst and the other list containing all of the data in the expected world model; processing then returns to 920 where processing continues on the most recent data received from the environment analyst.

Figure 10A:
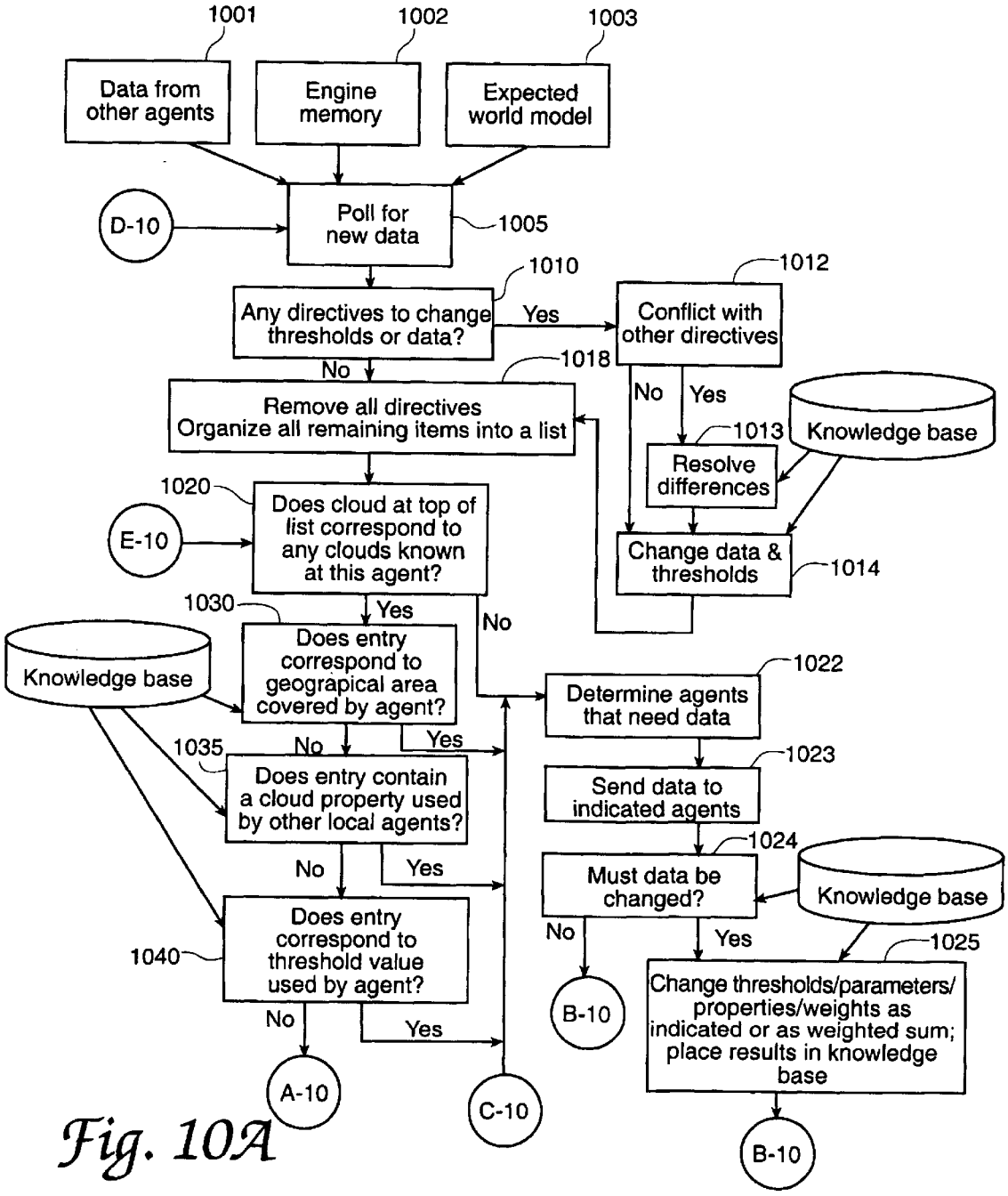
FIG. 10A shows a first part of operation of a Feedback Analyst.
Figure 10B:
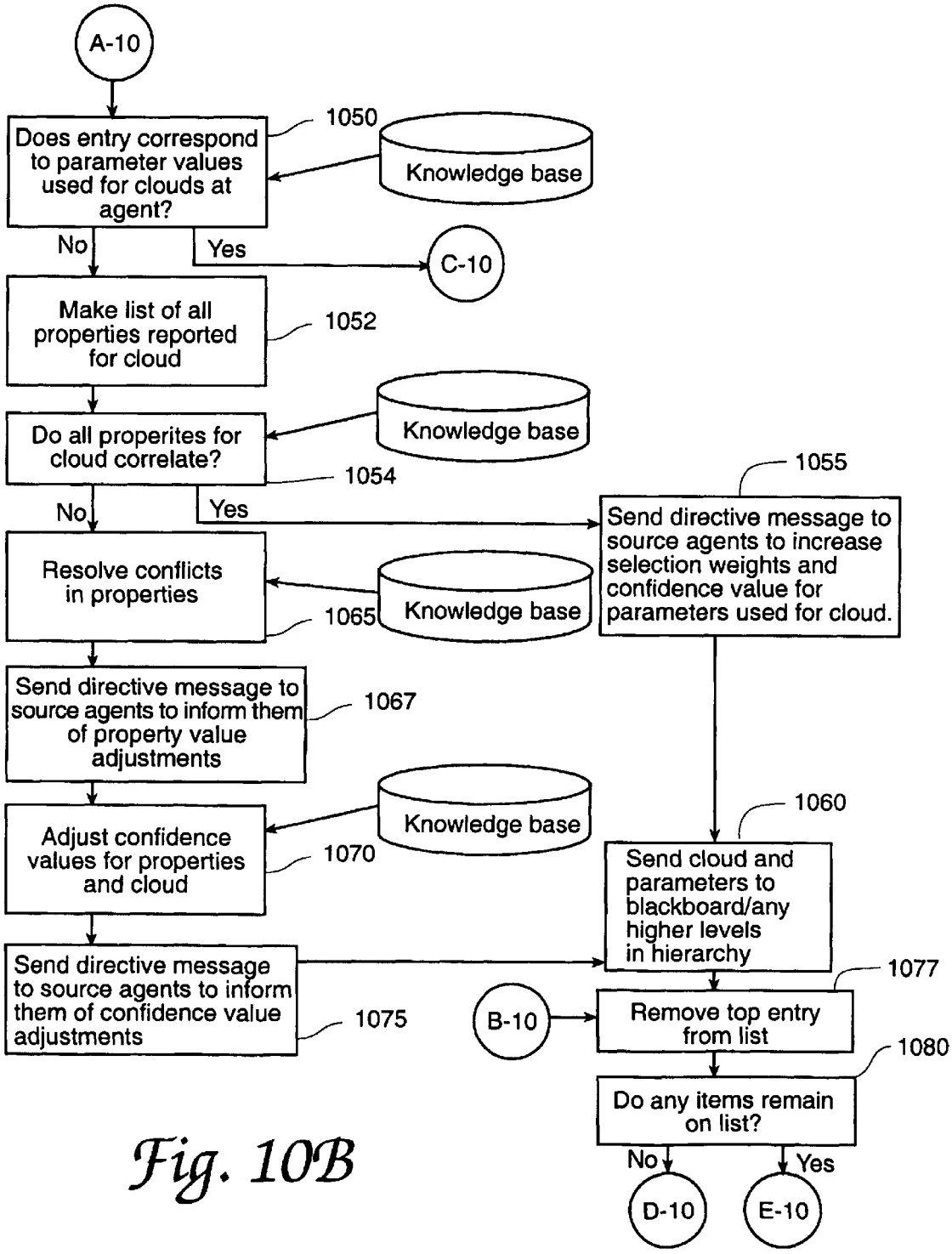
FIG. 10B shows a second part of operation of a Feedback Analyst.

FIG. 10, which is made-up of the parts FIG. 10A and FIG. 10B, shows operation of the Feedback Analyst. The Feedback Analyst agent takes information provided as feedback from other intelligent agents in the hierarchy and from local agents in the agent society, the engine memory, and the Expected World Model and provides feedback concerning performance accuracy to the other agents in its agent society. The Feedback Analyst agent operates as follows. At 1005, the agent polls for new data from other agents, Engine memory, and the expected world model at 1001, 1002, and 1003 respectively. Once new data is obtained at 1005, processing advances to 1010 where the agent determines if it has been provided with any directives to change thresholds or data; if it has received directives processing advances to 1012 otherwise processing advances to 1018. At 1012 the agent determines if the directive conflicts with any other directives it may have received; if there is a conflict, processing advances to 1013, otherwise processing advances to 1014. At 1013, the agent uses its knowledge base to resolve the conflict in the directives and then processing advances to 1014. At 1014, the agent changes the data and/or thresholds as ordered in all of the directives it currently has received and then processing advances to 1018.

At 1018, the agent removes all of the directives from the input data and then organizes all remaining items into a list ordered by cloud identifier; processing then advances to

1020. At 1020, the agent examines the cloud and its data at the top of the list and determines if this cloud corresponds to any clouds currently known to this agent. If the cloud does not, processing advances to 1022 otherwise processing proceeds to 1030. At 1022, the Feedback Analyst determines the other agents that need the data associated with this newly identified cloud and at 1023 sends the data to the agents that require the data; processing then advances to 1024. At 1024 the Feedback Analyst agent uses its knowledge base to determine if there is data that is must change in order to allow it to detect clouds of this type in the future because a potential error in the knowledge base has been detected. If data must be changed, processing advances to 1025 where the agent uses information in the knowledge base to appropriately change the parameters, thresholds, weights, or other properties associated with detecting this cloud and then processing advances to 1075.

If no data needs to be changed, then processing advances to 1077. If at 1020 the cloud at the top of the list does correspond to a cloud known to this agent, processing advances to 1030, where the agent uses the information in its knowledge base to determine if the cloud corresponds to any geographical area covered or examined by this agent. If it does, then processing advances to 1022; otherwise processing proceeds to 1035. At 1035, the agent uses the information in its knowledge base to determine if the top entry in the list contains data for a cloud property, if it does then processing proceeds to 1022; otherwise processing advances to 1040. At 1040, the agent uses the information in its knowledge base to determine if the top entry in the list contains data that corresponds to or affects a threshold value used by this agent; if it does then processing advances to 1022 otherwise processing advances to 1050. At 1050, using the knowledge base the agent determines if the entry at the top of the list makes use of a parameter value for clouds that the agent uses, if it does then processing proceeds to 1022 otherwise processing advances to 1052. At 1052, the agent makes a list of all of the properties reported for the cloud at the top of the list and then processing advances to 1054. At 1054, the agent uses the information in the knowledge base to determine if all of the properties for the cloud correlate with each other, to insure that there are no inconsistencies in the properties. If the parameters correlate, processing advances to 1055 otherwise processing proceeds to 1065. At 1055, the Feedback agent sends a directive message to source agents used to identify the cloud to increase their selection weights and confidence value for parameters used to identify the cloud since these parameters were able in combination to detect the cloud; and then processing advances to 1060. If at 1054 the properties for the cloud do not correlate, then processing advances to 1065.

At 1065, the Feedback agent uses the information in its knowledge base to resolve the conflicts in the properties and then processing advances to 1067. At 1067, the Feedback agent sends a directive message to the source agents for the cloud to inform them of property value adjustments that have been made. Processing then advances to 1070, where the Feedback agent uses the information in the knowledge base to adjust the confidence values for the properties for the cloud. Processing then advances to 1075, where the agent sends a directive message to source agents for the cloud to inform them of the adjustments that were made to the confidence values. Processing then advances to 1060, where the agent sends the cloud and parameter values to the blackboard and/or to any agents at higher levels in the agent hierarchy. From 1060, processing advances to 1077, where the Feedback agent removes the cloud and all of its parameters from the top of the list and processing advances to 1080. At 1080, the Feedback agent determines if any clouds remain on the list. If clouds remain in the list, processing returns to 1020, otherwise processing proceeds to 1005 where the Feedback agent polls for new data once again.

In summary, substantial benefits have been made available through utilizing the principles of the present invention; these benefits include:

1. Complete coverage for detection and tracking purposes across a wide area.
2. The sensitivity and accuracy of the system is only limited by the characteristics of the sensors and the contents of the knowledge base.
3. Capability for real-time monitoring of large-scale substance attacks anywhere within the United States or the world.
4. While each data source employed is known, it is their combination and the sensor resolution possible that makes the invention notable. It is believed that no one has attempted performing the type of real-time data acquisition, synthesis, and fusion needed to detect and track agents in the manner of the invention.
5. The intelligent agent hierarchy can be made as complex as required.
6. The intelligent agent hierarchy is scalable in terms of computational power and number of parameters to be examined. Any number of computers can be used in the invention, including up to one computer per intelligent agent.
7. The intelligent agent hierarchy can be scaled to examine any desired number of parameters or factors.
8. The intelligent agent hierarchy can be scaled to use the data produced by any desired number of sensors.
9. The intelligent agent hierarchy and each intelligent agent can use any decision making/analysis system.
10. The intelligent agent hierarchy can use multiple different decision making/analysis systems throughout the hierarchy.
11. Each agent in the intelligent agent hierarchy operates independently.
12. The included data transmission format provides an application, reasoning system, reasoning format, and knowledge content independent means for representing knowledge.
13. Any intelligent agent can use the included data transmission format to transmit the results of its analysis to any other intelligent agent in the invention's system.
14. The data transmission format can be used to transmit data between intelligent agents using a computer network or any type of data storage medium.
15. The data transmission format is completely self-contained, documentation external to the information in the format is not required to understand the syntax and semantics of the information contained in the information transmission format.
16. The data transmission format can be directly read and used by either a human or a computer.
17. The data transmission format permits the security classification of each element of a knowledge base to be embedded within the knowledge base.
18. The data transmission format permits the accuracy, assurance, and non-corruption of the contents of a transmission to be insured and verified using standard computer checksum and encryption technologies.

19. The data transmission format inherently supports multiple levels of security within a transmission and inherently support automatic, computer-controlled selective extraction of data within a transmission based upon each element's individual classification.
20. The data transmission format inherently supports automatic verification of the propriety, appropriateness, or suitability of a data transfer on an element-by-element basis.
21. The data transmission format provides inherent support for documenting the pedigree, source authority, and augmentation of the contents of a transmission for each transmission.

The foregoing description of the preferred embodiment has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the inventions in various embodiments and with various modifications as are suited to the particular scope of the invention as determined by the appended claims when interpreted in accordance with the breadth to which they are fairly, legally and equitably entitled.

APPENDIX 1

The eXtensible Markup Language

The eXtensible Markup Language (XML) is a meta-language permitting the user/designer to define components of the language (syntax, data types, vocabulary, and operators) needed to achieve a required capability using a Document Type Definition (DTD). An XML-based transmission representation has three parts, the XML document, the Document Type Definition, and the XML Stylesheet. The stylesheet adresses only appearance issues, and therefore is not further discussed. An XML-based document has a standard format and a limited number of pre-defined tags. An XML document consists of one or more elements, marked as shown in the Example 1 below.

| Example 1: XML Document Element Format |
|---|
| <Start><br>Element text to be transmitted<br></Start> |

An element consists of two tags, an opening tag (< >) and a closing tag (</>), with the name of the tag appearing between the < and the >. The nesting of the tags within the XML document must correspond to the nesting specified within the DTD. An XML document always begins with the XML declaration in the following format, <?xml version="1.0" standalone="no"?>. The declaration specifies the version of XML being used and whether or not an external DTD is required. This particular specification indicates that an external DTD is needed by a parser to understand the structure of the document; alternatively, saying yes means that a DTD is embedded within the XML document. The second line contains the entry: <?DOCTYPE DMTITE:RuleBased SYSTEM "sample.dtd">. This entry defines the root element of the document (DMTITE:RuleBased) and the location of the DTD. The remainder of the document contains tags defined in the DTD and the corresponding data to be transmitted.

The Document Type Definition (DTD) specifies how the elements (contents) of a document must relate to each other. Each element is defined using a <!ELEMENT> declaration in the following format: <!ELEMENT elementname rule >. There are a number of keywords that can be used to define the rule, including the keywords ANY and #PCDATA. The ANY keyword indicates that any character data or keyword can appear within the element. The keyword #PCDATA indicates that only generally character data can appear within the element. To indicate that multiple elements must appear in a specific sequence, commas are used to separate the instances. Parentheses are used to group declarations. Within a declaration, one of three operators can be used to specify the number of occurrences of an element. The ? operator indicates that the element must appear once or not at all. The + operator indicates that the element must appear at least once. The * operator indicates that the element can appear any number of times or not at all. Within the DTD, attributes can be defined for any element. An attribute is defined using the <!ATTLIST> declaration, which has the form <!ATTLIST target_element attribute_name attribute_type default>. Data types include character data (CDATA) and enumerated data, as well as the keywords #REQUIRED, #IMPLIED, and #FIXED. Using these components as a basis in conjunction with a set of topic-specific keywords, a document type can be defined. The unusual capitalization of the word "eXtensible" employed herein is in accordance with prevailing practice in the artificial intelligence art. Herein this word is intended to be of a generic description rather than a specific language limiting nature.

We claim:

1. The method of detecting and tracking chemical and biological warfare agent plumes over a geographic area, said method comprising the steps of:

disposing a plurality of diverse input condition responsive warfare agent sensor elements above said geographic area of detecting and tracking;

coupling an output from each of said diverse input condition responsive warfare agent sensor elements to a sensor-specific first level intelligent agent decision element in a hierarchical array of intelligent agent decision elements;

extracting, in said sensor specific first level intelligent agent decision element, cloud-related signal indicia from said output, said extracting including applying segmented output data and first level intelligent agent knowledge base data to a decision engine algorithm portion of said sensor-specific first level intelligent agent decision element to generate a sensor-specific first level intelligent agent decision element eXtensible markup language document type definition output;

said sensor-specific first level intelligent agent decision element eXtensible markup language document type definition output also including a cloud identification output and a warfare agent sensor element output quality-determined first confidence signal;

applying said eXtensible markup language document type definition output of said sensor-specific first level intelligent agent decision element to a plurality of second and successive other mid level intelligent agent decision elements in said hierarchical array of intelligent agent decision elements;

evaluating in said mid level intelligent agent elements cloud, weather condition, ground condition and cloud duplicate related outputs received via said mid level eXtensible markup language document type definition outputs of said first level intelligent agent elements;

said evaluating step including a determination of possible natural cause for said cloud-related outputs, a determination of said cloud-related outputs being a warfare agent plume and a determination of a second confidence signal, said determinations being encoded into an intelligent agent decision element eXtensible markup language document type definition output;

connecting said second intelligent agent decision element eXtensible markup language document type definition output to a plurality of upper level intelligent agent decision elements in said hierarchical array of intelligent agent decision elements; and determining in said plurality of upper level intelligent agent decision elements in said hierarchical array of intelligent agent decision elements an occurrence of a warfare substance attack event and a course of travel for said warfare agent plume in said geographic area, said determining including determining a third confidence signal level and encoding of said determining step signals into an intelligent agent decision element eXtensible markup language document type definition output.

2. The method of detecting and tracking chemical and biological warfare agent plumes over a geographic area of claim 1 wherein said diverse input condition responsive warfare agent sensor elements include at least one of an infrared radar apparatus, a synthetic aperture radar apparatus and an ultraviolet sensor apparatus.

3. The method of detecting and tracking chemical and biological warfare agent plumes over a geographic area of claim 1 wherein said intelligent agent decision elements each comprise a physical representation component, a cognitive component, an agent interface component and a knowledge base component.

4. The method of detecting and tracking chemical and biological warfare agent plumes over a geographical area of claim 3 wherein said intelligent agent decision element physical representation component comprises an external environmental model inclusive of terrain description data, sun position data, moon position data, major water body description data, weather data, soil temperature data, soil moisture content data and cloud reflectance data.

5. The method of detecting and tracking chemical and biological warfare agent plumes over a geographical area of claim 3 wherein said intelligent agent decision element knowledge base component includes mission related input and output data definitions, intelligent agent decision element instructional data and a confidence determination algorithm.

6. The method of detecting and tracking chemical and biological warfare agent plumes over a geographic area of claim 3 wherein said intelligent agent decision element cognitive component includes a knowledge base component and a physical representation component responsive decision engine element.

7. The method of detecting and tracking chemical and biological warfare agent plumes over a geographic area of claim 6 wherein said knowledge base component and physical representation component responsive decision engine element includes a current world model processing algorithm, an expected world model processing algorithm, an environment analyst processing algorithm, an other sensor inputs analyst processing algorithm, a feedback analyst processing algorithm and an engine memory component each having two way communication within said decision engine element.

8. The method of detecting and tracking chemical and biological warfare agent plumes over a geographic area of claim 7 wherein said environment analyst processing algorithm includes a cloud-related sensor data examination routine.

9. The method of detecting and tracking chemical and biological warfare agent plumes over a geographic area of claim 7 wherein said current world model processing algorithm includes a cloud-related examination routine having environment analyst processing algorithm generated input data.

10. The method of detecting and tracking chemical and biological warfare agent plumes over a geographic area of claim 7 wherein said expected world model processing algorithm includes a cloud data change-related examination routine.

11. The method of detecting and tracking chemical and biological warfare agent plumes over a geographic area of claim 7 wherein said other sensor analyst processing algorithm includes a cloud-related data examination routine having data inputs from a plurality of other algorithms in said decision engine element.

12. The method of detecting and tracking chemical and biological warfare agent plumes over a geographic area of claim 7 wherein said feedback analyst processing algorithm includes data inputs from a plurality of other algorithms in said decision engine element and conditional outputs to a plurality of algorithms in said decision engine element.

13. Chemical and biological warfare agent plumes detection and tracking apparatus comprising the combination of:

a plurality of diverse input condition responsive warfare agent sensor elements dispersed above a geographic area for detecting and tracking; and a hierarchical array of intelligent agent decision elements coupled to outputs of said diverse input condition responsive warfare agent sensor elements;

said hierarchical array of intelligent agent decision elements including sensor specific first level intelligent agent decision elements generating eXtensible markup language document type definition outputs including a cloud identification output and a warfare agent sensor element output and a confidence output in response to segmented data received from said diverse input condition responsive warfare agent sensor elements;

said hierarchical array of intelligent agent decision elements also including a plurality of mid level intelligent agent decision elements determining cloud-related signal indicia originating in a warfare agent plume;

said hierarchical array of intelligent agent decision elements also including a plurality of upper level intelligent agent decision elements determining a course of travel for said warfare agent plume in said geographic area.

14. The method of detecting and tracking a cloud of chemical warfare substance over a geographic area, said method comprising the steps of:

coupling an output from each of diverse input condition responsive warfare substance sensor elements to a hierarchy of intelligent agent software embodied decision making algorithms disposed in an array of lower level, mid level and upper level intelligent agents;

comparing a plurality of currently received chemical warfare substance signatures from said chemical warfare substance sensor elements with stored previous similar signatures in an ongoing sequence of comparison events accomplished within said hierarchy of intelligent agent software embodied decision making algorithms;

upgrading and refining said stored previous similar signatures as said comparing step ongoing sequence ensues;

communicating data relating to said chemical warfare substance signatures; including a data confidence signal, from intelligent agent decision making algorithms in said hierarchy of intelligent agent software embodied signal processing algorithms in a uniform, stable, human comprehensible communication language;

outputting signals identifying presence of said chemical warfare substance, movement of a cloud of said chemical warfare substance and dispersion of a cloud of said chemical warfare substance from said hierarchy of intelligent agent software embodied decision making algorithms in said same uniform, stable, human comprehensible communication language.

15. The method of detecting and tracking a cloud of chemical warfare substance material over a geographic area of claim 14 wherein said hierarchy of intelligent agent software embodied decision making algorithms include one of Bayesian network, fuzzy logic rules, case based reasoning, probabilistic reasons and genetic algorithm decision making systems.

16. The method of detecting and tracking a cloud of chemical warfare substance material over a geographic area of claim 14 wherein each said intelligent agent in said hierarchy of intelligent agent software embodied decision making algorithms comprises a physical representation component, a cognitive component, an agent interface and a knowledge base.

17. The method of detecting and tracking a cloud of chemical warfare substance material over a geographic area of claim 14 wherein said step of communicating data relating to said chemical warfare substance signatures, including a data confidence signal, from intelligent agent decision making algorithms in said hierarchy of intelligent agent software embodied signal processing algorithms in a uniform, stable, human comprehensible communication language includes communicating data according to an eXtensible Markup Language document type definition.

18. The method of detecting and tracking a cloud of biological warfare substance over a geographic area, said method comprising the steps of:

coupling an output from each of diverse input condition responsive biological warfare substance sensor elements to a hierarchy of intelligent agent software embodied decision making algorithms disposed in an array of lower level, mid level and upper level intelligent agents;

comparing a plurality of currently received biological warfare substance signatures from said biological warfare substance sensor elements with stored previous similar signatures in an ongoing sequence of comparison events accomplished within said hierarchy of intelligent agent software embodiment decision making algorithms;

upgrading and refining said stored previous similar signatures as said comparing step ongoing sequence ensues;

communicating data relating to said biological warfare substance signatures, including a data confidence signal, from intelligent agent decision making algorithms in said hierarchy of intelligent agent software embodied signal processing algorithms in a uniform, stable, human comprehensible communication language according to an eXtensible Markup Language document type definition;

outputting signals identifying presence of said biological warfare substance, movement of a cloud of said biological warfare substance and dispersion of a cloud of said biological warfare substance from said hierarchy of intelligent agent software embodied decision making algorithms in said same uniform, stable, human comprehensible communication language.

19. The method of detecting and tracking a cloud of biological warfare substance material over a geographic area of claim 18 wherein said hierarchy of intelligent agent software embodied decision making algorithms include one of Bayesian network, fuzzy logic rules, case based reasoning, probabilistic reasoning and genetic algorithm decision making systems.

20. The method of detecting and tracking a cloud of chemical warfare substance material over a geographic area of claim 18 wherein each said intelligent agent in said hierarchy of intelligent agent software embodied decision making algorithms comprises a physical representation component, a cognitive component, an agent interface and a knowledge base.

21. The method of detecting and tracking a cloud of biological warfare substance material over a geographic area of claim 18 wherein said step of communicating data relating to said biological warfare substance signatures, including a data confidence signal, from intelligent agent decision making algorithms in said hierarchy of intelligent agent software embodied signal processing algorithms in a uniform, stable, human comprehensible communication language includes communicating data according to an eXtensible Markup Language document type definition.

22. The method of detecting and tracking chemical and biological warfare agent plumes over a geographic area, said method comprising the steps of:

disposing a plurality of input condition responsive warfare agent sensor elements taken from the group of an infrared radar apparatus, a synthetic aperture radar apparatus and an ultraviolet sensor apparatus above said geographic area of detecting and tracking;

coupling an output signal from each of said input condition responsive warfare agent sensor elements to a sensor-specific first level intelligent agent decision element comprising a physical representation component and a cognitive component and an agent interface component and a knowledge base component in a hierarchical array of intelligent agent decision elements;

said intelligent agent decision element physical representation component comprising an external environment model inclusive of terrain description data, sun position data, moon position data, major water body description data, weather data, soil temperature data, soil moisture content data and cloud reflectance data;

said sensor-specific first level intelligent agent decision element further including a physical representation component, a cognitive component, an agent interface component and a knowledge base component;

extracting, in said sensor specific first level intelligent agent decision element, cloud-related signal indicia from said output, said extracting including applying segmented output data and first level intelligent agent knowledge base data to a decision engine algorithm portion of said sensor-specific first level intelligent agent decision element to generate a sensor-specific first level intelligent agent decision element eXtensible markup language document type definition output;

said first level intelligent agent knowledge base data including mission related input and output data definitions, intelligent agent decision element instructional data and a confidence determination algorithm;

said sensor-specific first level intelligent agent decision element eXtensible markup language document type definition output also including a cloud identification output and a warfare agent sensor element output quality-determined first confidence signal;

applying said eXtensible markup language document type definition output of said sensor-specific first level intelligent agent decision element to a plurality of second and successive other mid level intelligent agent decision elements in said hierarchical array of intelligent agent decision elements;

said knowledge base component and physical representation component responsive decision element including a current world model processing algorithm, an expected world model processing algorithm, an environment analyst processing algorithm, an other sensor inputs analyst processing algorithm, a feedback analyst processing algorithm and a memory component each having two way communication within said decision element;

said cloud related examination routing having environment analyst processing algorithm generated input data, said current world model processing algorithm including a cloud-related examination routing having environmental analyst processing algorithm generated input data, said expected world model processing algorithm including a cloud data change-related examination routing, said other sensor analyst processing algorithm including a cloud-related data examination routing having data inputs from a plurality of other algorithms in said decision engine element and said feedback analyst processing algorithm including data inputs from a plurality of other algorithms in said decision engine element and conditional outputs to a plurality of algorithms in said decision engine element;

evaluating in said mid level intelligent agent elements cloud, weather conditions, ground condition and cloud duplicate related outputs received via said mid level eXtensible markup language document type definition outputs of said first level intelligent agent elements;

said evaluating step including a determination of possible natural cause for said cloud-related outputs, a determination of said cloud-related outputs being a warfare agent plume and a determination of a second confidence signal, said determinations being encoded into an intelligent agent decision element eXtensible markup language document type definition output;

connecting said second intelligent agent decision element eXtensible markup language document type definition output to a plurality of upper level intelligent agent decision elements in said hierarchical array of intelligent agent decision elements; and determining in said plurality of upper level intelligent agent decision elements in said hierarchical array of intelligent agent decision elements an occurrence of a warfare substance attack event and a course of travel for said warfare agent plume in said geographic area, said determining including determining a third confidence signal level and encoding of said determining step signals into an intelligent agent decision element eXtensible markup language document type definition output.

* * * * *